United States Patent [19]
Yamamoto

[11] Patent Number: 6,115,768
[45] Date of Patent: Sep. 5, 2000

[54] SYSTEM AND METHOD FOR CONTROLLING MAIN MEMORY EMPLOYING PIPELINE-CONTROLLED BUS

[75] Inventor: Hirofumi Yamamoto, Tokyo, Japan

[73] Assignee: NEC Corporation, Tokyo, Japan

[21] Appl. No.: 09/182,239

[22] Filed: Oct. 30, 1998

[30] Foreign Application Priority Data

Oct. 30, 1997 [JP] Japan ..................................... 9-314213

[51] Int. Cl.⁷ .......................... G06F 13/16; G06F 13/362; G06F 13/368
[52] U.S. Cl. .......................... 710/107; 710/113; 710/119; 710/240; 711/5; 711/104
[58] Field of Search ............................... 710/36, 39, 107, 710/113, 119, 126, 240, 241, 242, 244; 711/5, 104, 106, 109, 112, 148, 150, 152, 154; 365/230.01, 230.03, 222; 370/462

[56] References Cited

U.S. PATENT DOCUMENTS

| 5,412,788 | 5/1995 | Collins et al. . |
| 5,440,713 | 8/1995 | Lin et al. . |
| 5,548,793 | 8/1996 | Sprague et al. . |
| 6,026,464 | 2/2000 | Cohen . |

FOREIGN PATENT DOCUMENTS

| 54-39549 | 3/1979 | Japan . |
| 61-91740 | 5/1986 | Japan . |
| 64-88668 | 4/1989 | Japan . |
| 64-91255 | 4/1989 | Japan . |
| 2-235154 | 9/1990 | Japan . |
| 3-65746 | 3/1991 | Japan . |
| 4-241665 | 8/1992 | Japan . |
| 5-108476 | 4/1993 | Japan . |
| 7-200459 | 8/1995 | Japan . |
| 8-171512 | 7/1996 | Japan . |

*Primary Examiner*—Gopal C. Ray
*Attorney, Agent, or Firm*—McGinn & Gibb, P.C.

[57] ABSTRACT

A memory control system comprises a main memory including a plurality of banks; two or more requesters each of which includes an MPU or an I/O section which outputs a request that is addressed to a bank of the main memory; and a pipeline-controlled system bus connecting the main memory and each requester. Each requester includes a request sending control circuit, a system bus arbitration circuit, and a bank busy management section. The request sending control circuit which received a request from the MPU or the I/O section executes a system bus acquisition request to the system bus arbitration circuit of the requester and other requesters after confirming that the bank to which the request has been addressed is not busy for the request by referring to the bank busy management section. The system bus arbitration circuit executes distributed arbitration between system bus acquisition requests and informs the bank busy management section about a request type and a bank number concerning a system bus acquisition request that could acquire the system bus. Based on the information, the bank busy management section manages bank busy statuses of the banks with regard to each request type. The request sending control circuit sends the request to the main memory via the pipeline-controlled system bus if the system bus could be acquired in the distributed arbitration.

18 Claims, 22 Drawing Sheets

F I G. 12
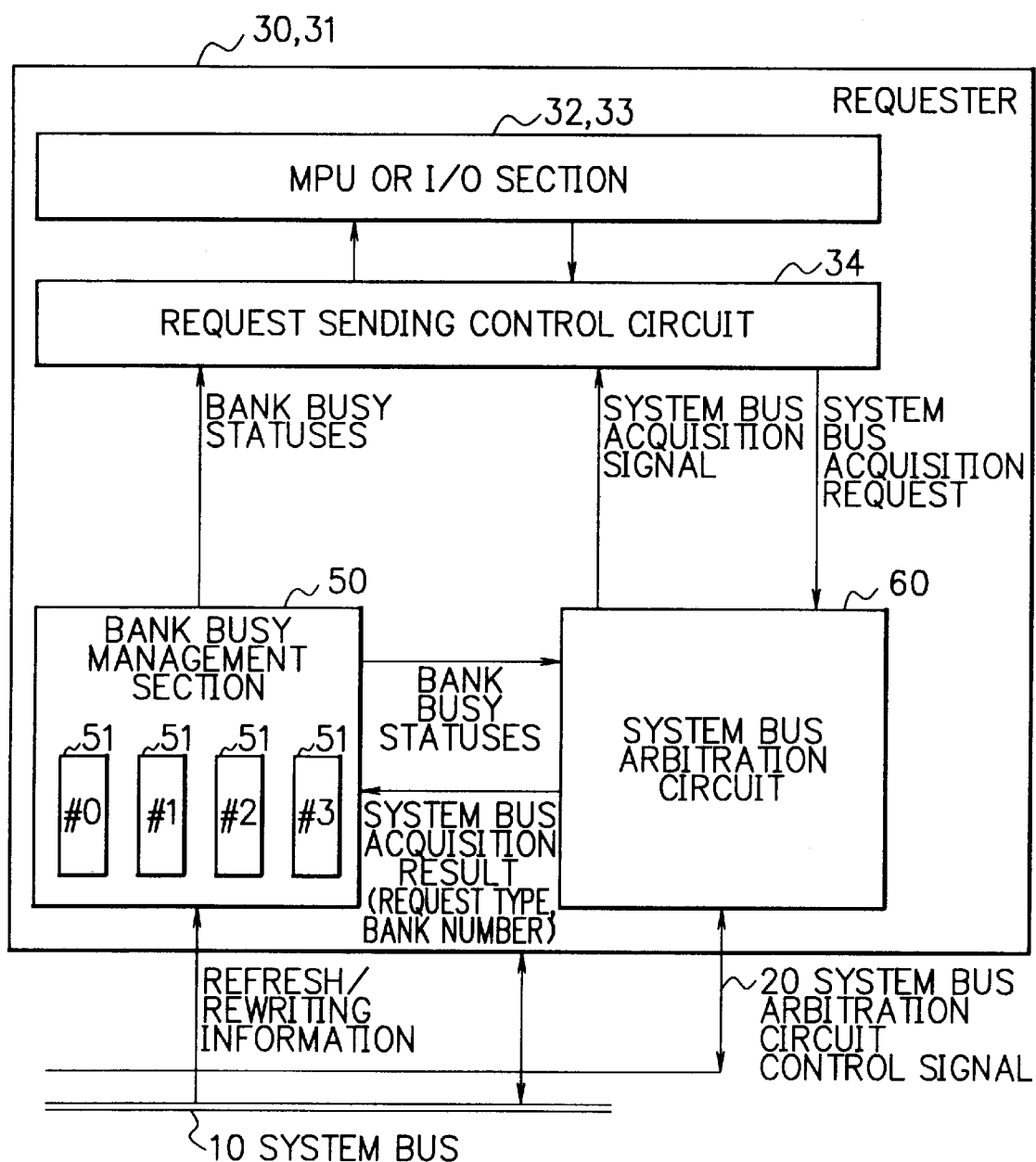

F I G. 14
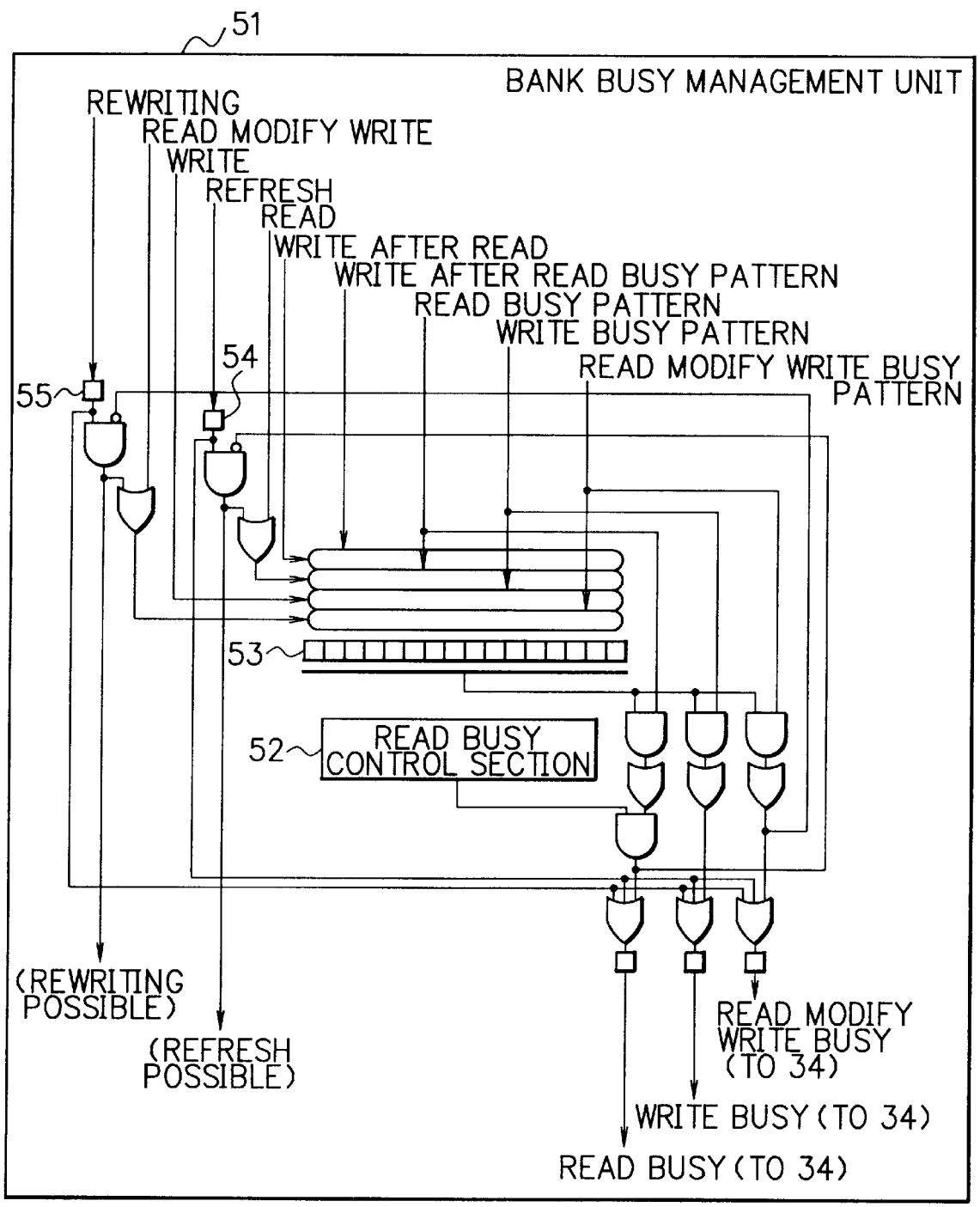

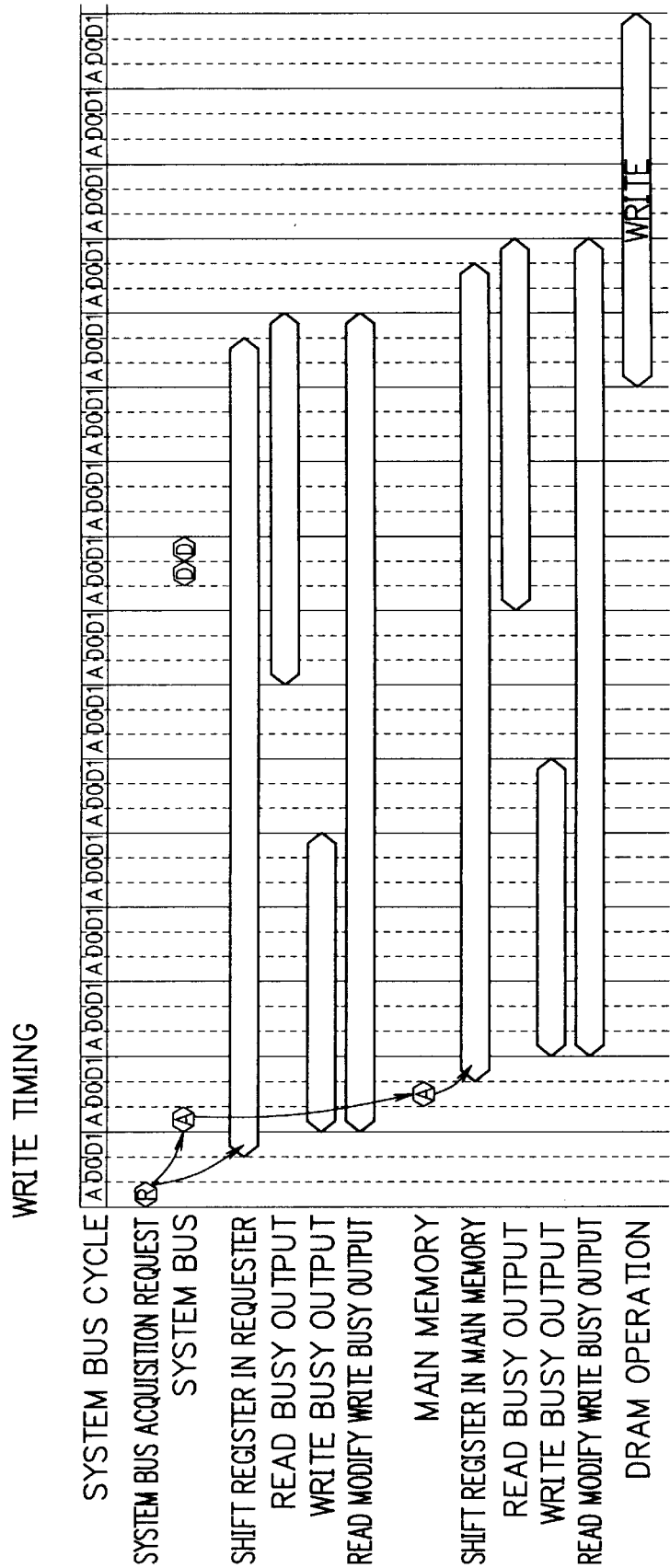

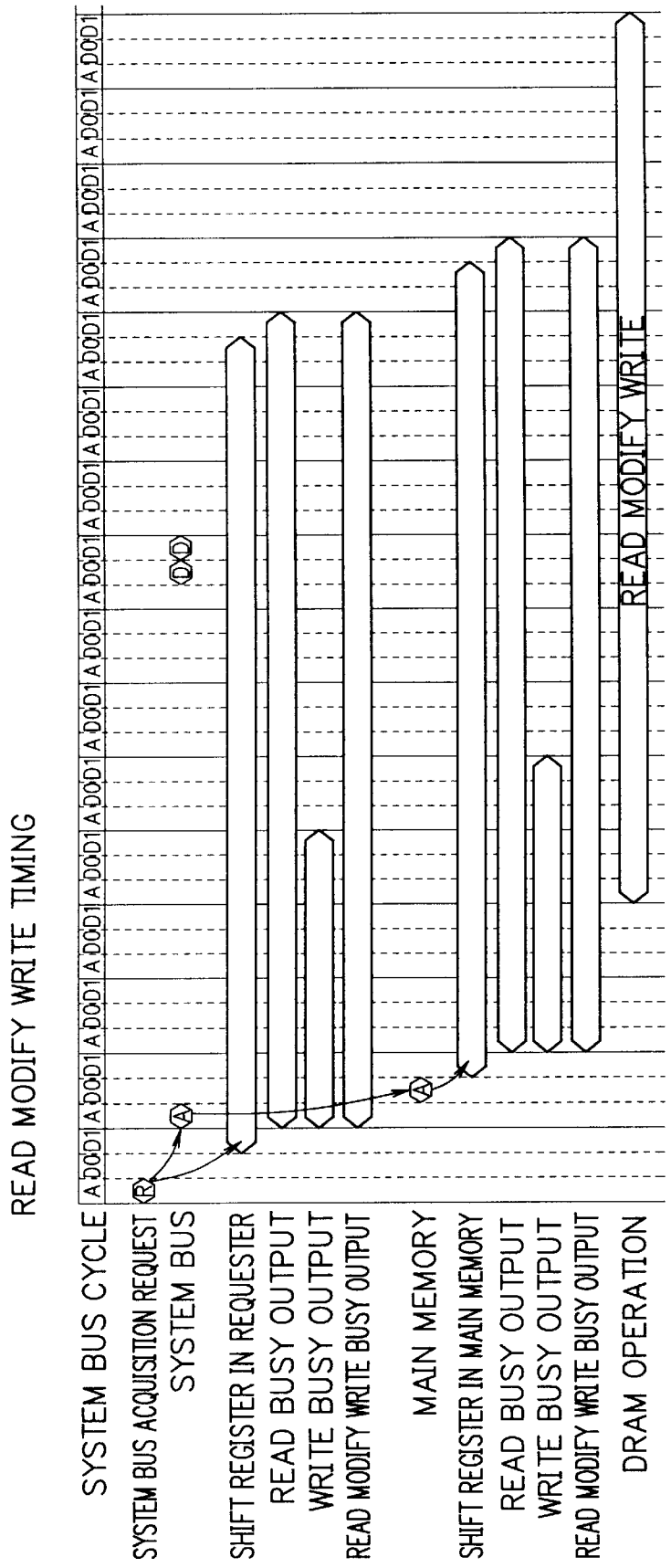

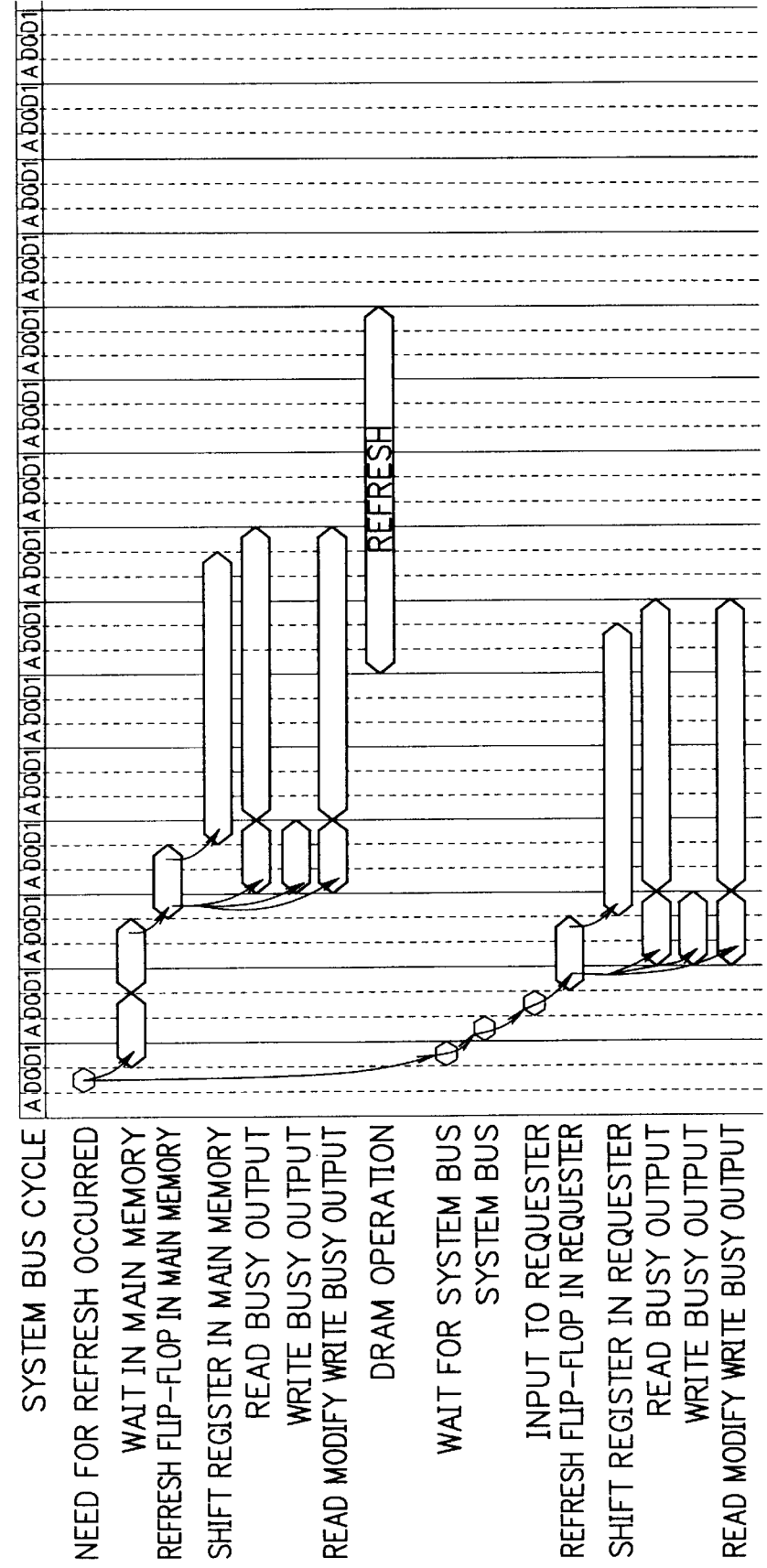

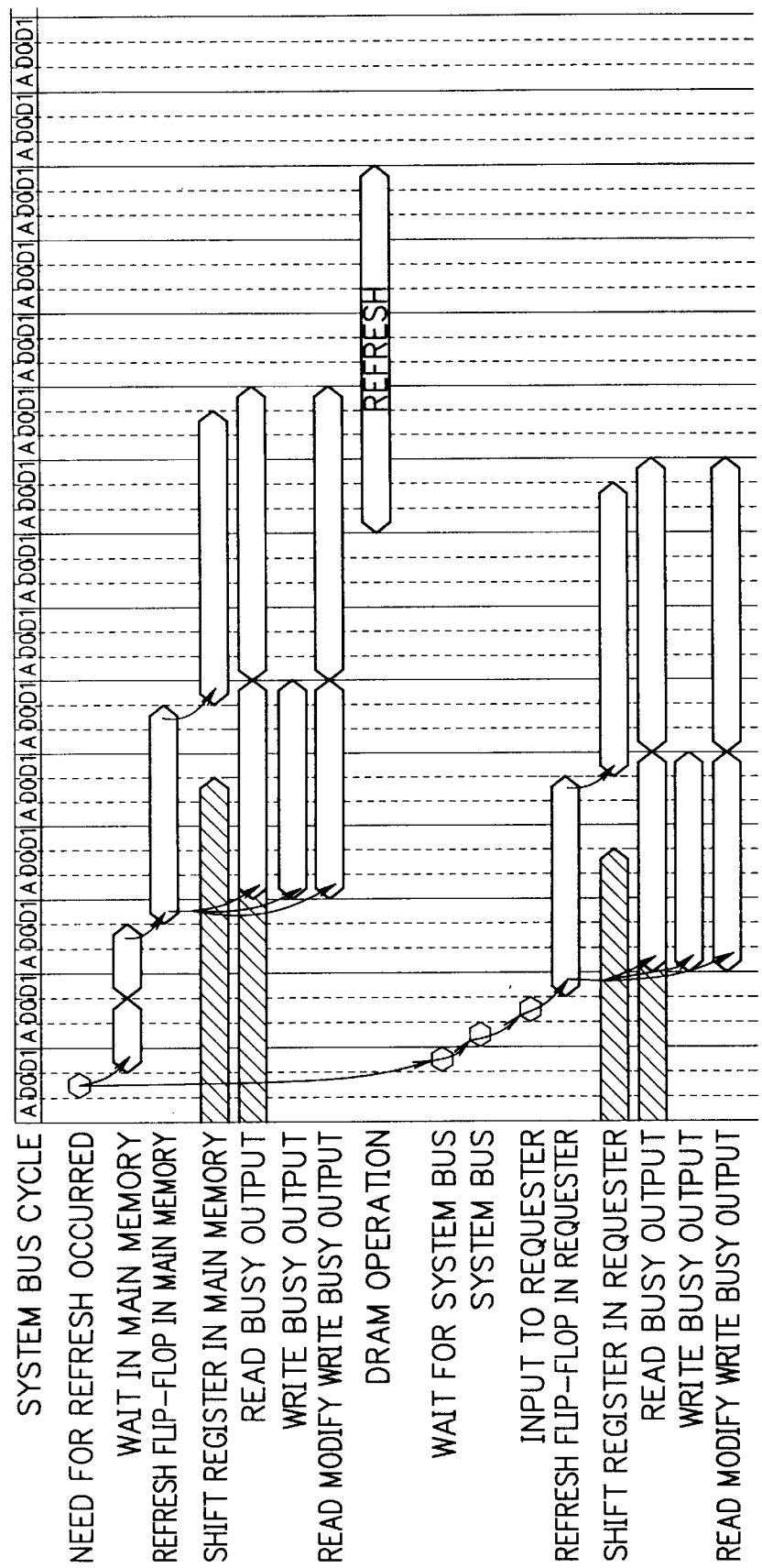

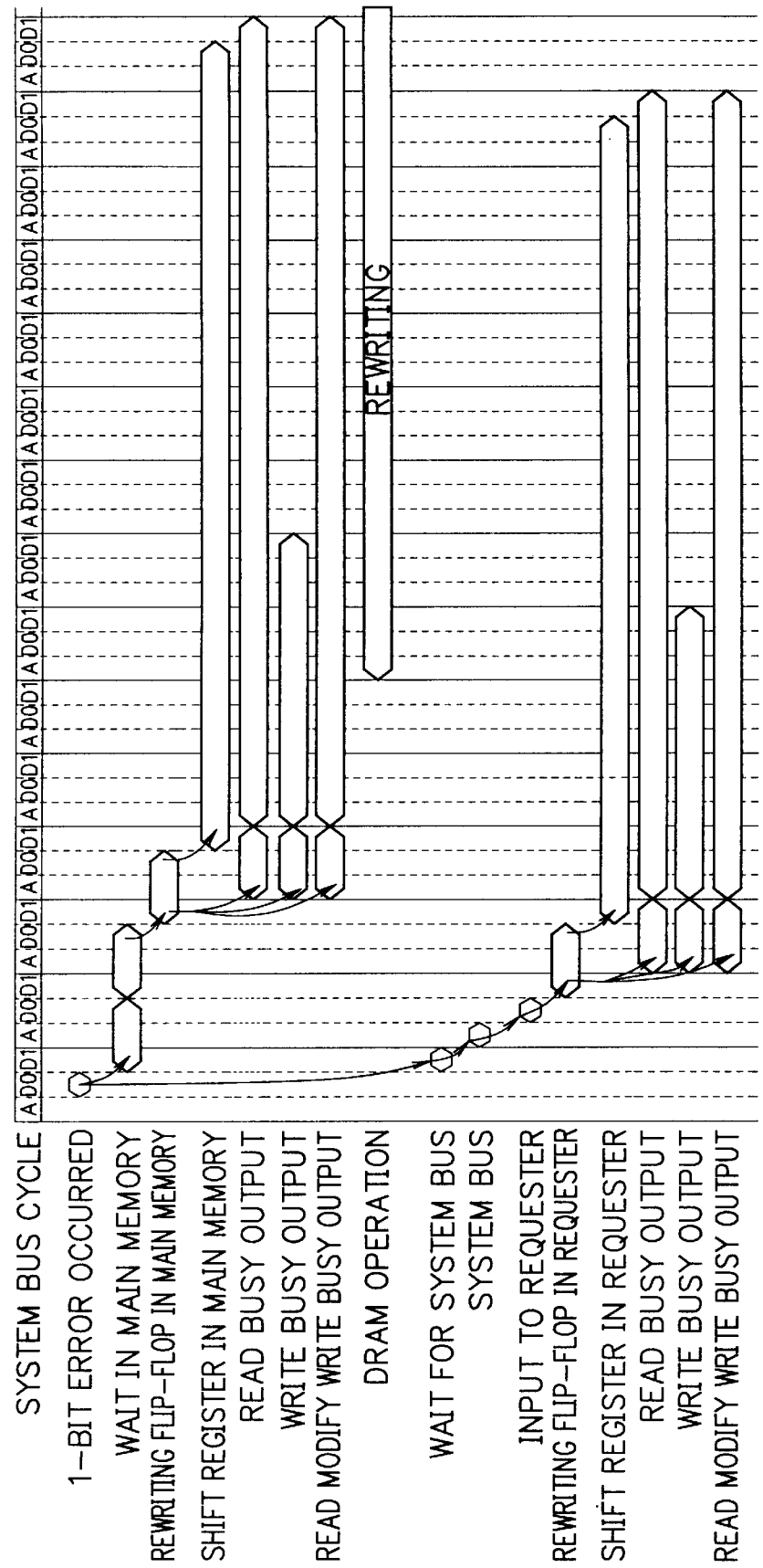

REWRITING TIMING #2

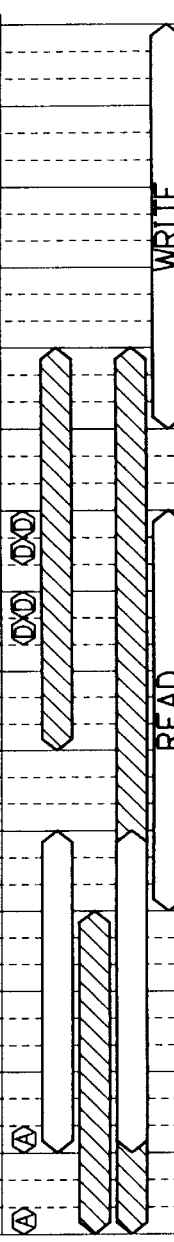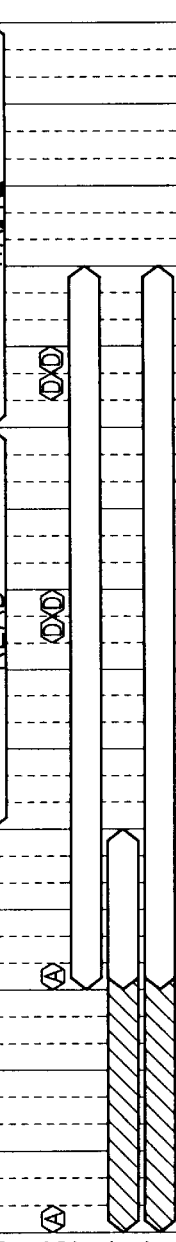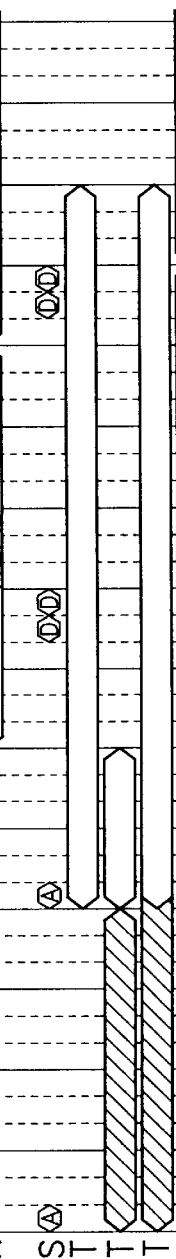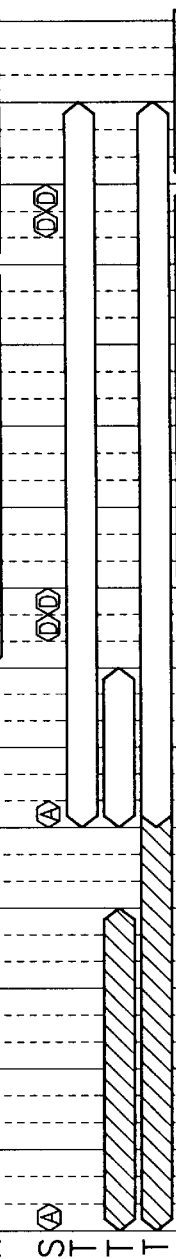

SYSTEM AND METHOD FOR CONTROLLING MAIN MEMORY EMPLOYING PIPELINE-CONTROLLED BUS

BACKGROUND OF THE INVENTION

The present invention relates to a system and a method for controlling a main memory in a computer, and in particular, to a system and a method for controlling a main memory which is connected via a pipeline-controlled bus to a plurality of requesters such as CPUs, I/O units, etc. that can send requests to the main memory.

DESCRIPTION OF THE PRIOR ART

In computers, the main memory is connected via a bus to a plurality of requesters (CPUs, I/O units, etc.) which can send requests (read requests, write requests, read modify requests, etc.) to the main memory. The bus which is employed for connecting the main memory and the requesters can basically be classified into two types: a split-controlled bus and a pipeline-controlled bus. In a computer employing a conventional split-controlled bus, acquisition of the right to use the bus had to be executed not only by requesters but also by the memory device, in order to prevent interference between write data and read data.

In a bus control system for controlling a split-controlled bus which has been disclosed in Japanese Patent Application Laid-Open No.SHO64-88668, the memory device sends out a response signal as a bus control signal when the memory device sends read data to the bus, instead of executing the bus acquisition. However, in such a system, first data bus acquisition priority must be always given to the response from the side of the memory device. Therefore, it is impossible to modify the data bus acquisition priority dynamically and arbitrarily, and thus performance of the bus and the system can not be further improved. Further, complicated bus control procedures becomes necessary, and thus large amount of hardware might be necessary.

Meanwhile, there has been proposed in Japanese Patent Application Laid-Open No.HEI2-235154 a memory controller for a main memory, which is provided with capability of checking busy statuses of banks of the main memory and selecting one request from requests that have been addressed to the same bank when requests concentrated into the bank. However, in a system employing a main memory provided with such a memory controller, the memory controller has to be provided with buffers for temporarily storing requests and write data. When one of the buffers becomes full, the memory controller has to inform the requesters that it can not receive any more requests, and thus the memory controller has to be provided with hardware for sending such information. Therefore, large amount of hardware becomes necessary on the side of the main memory.

In such a system in which means for managing bank busy statuses of the main memory is provided to the memory controller on the side of the main memory (especially when a split-controlled bus is employed), void requests, which will be cancelled on the side of the main memory, occur frequently, and thus the ratio of the number of void requests to the number of total requests tends to become high, therefore, it is difficult to improve performance of the system. The problem occurs since the requesters (CPUs, I/O units) send requests regardless of the bank busy statuses of the banks in the main memory without grasping the bank busy statuses, and the requests are cancelled on the side of the main memory, and the requesters repeat sending the same requests when the main memory can not receive the requests.

In addition, the memory controller (or the main memory) requires far larger and complicated logical construction when the split-controlled bus is employed for connecting the requesters and the main memory, in comparison with cases where the pipeline-controlled bus is employed, and thus such a memory controller or main memory in a system employing the split-controlled bus needs considerably large hardware. As mentioned above, when the split-controlled bus is employed, the requesters (CPUs, I/O units) send requests without grasping the bank busy statuses of the banks of the main memory, and thus the main memory or the memory controller has to be provided with buffers for temporarily storing addresses and data which are sent from the requesters and logic for controlling them. The main memory or the memory controller has to inform the requesters that it can not receive any more requests when one of the buffers became full, and thus hardware for sending such information becomes necessary. Further, means for preventing interference between write data from the requesters and read data from the main memory which are transmitted on the bus also becomes necessary.

On the other hand, it is possible to employ the pipeline-controlled bus for connecting the main memory and the requesters and provide the main memory bank busy status management means in the requesters, not on the side of the main memory. However, it is difficult to realize the management of bank busy statuses of the main memory on the side of the requesters correctly and adequately. For instance, there are cases where a requester sends a write request to an address of a bank of the main memory and then sends a read request to the same address of the same bank just after the write request in order to verify that the write request could successfully be completed, that is, in order to verify that write data could successfully be written to the address of the bank of the main memory. In such cases, the read request should not be executed before the write request is completed. If the read request is executed before the write request is completed (for example, between sending of the write request and arrival of write data to the main memory) in order to improve communication efficiency, wrong data (data before writing the write data) is read out from the address and thus the verification can not be executed correctly. Therefore, such memory control systems should be designed so that the bank will become busy for such a read request just after a write request. Under such design, no read request can be sent to a bank in the interval between sending of a write request to the same bank and completion of the write request, and thus the bank can not be utilized efficiently and it is difficult to improve performance of the system. In the system employing the pipeline-controlled bus, the relationship (interval) between transmission of an address and transmission of data due to a request is fixed. For example, read data is transmitted by the main memory to the pipeline-controlled bus a predetermined interval after reception of a read request (i.e. the address), and write data is transmitted by a requester to the pipeline-controlled bus a predetermined interval after sending of a write request (i.e. the address). Therefore, in the case of the write access, actual write access to the address is suspended for the interval until the write data is supplied to the main memory from the requester, and the bank is kept busy for read requests during the interval. However, as a matter of fact, the bank itself can accept and complete a read request in the interval.

In addition, it has been vary difficult to employ RAMs (Random Access Memory) of two or more different types, two or more different cycle times, etc. in a main memory, since the main memory bank busy status management means has to be designed to fit the particular type and cycle time of the RAM that is employed for the main memory.

SUMMARY OF THE INVENTION

It is therefore the primary object of the present invention to provide a system and method for controlling the main memory employing pipeline-controlled bus, by which usage efficiency of the bus can be increased by preventing sending of void requests to the bus by the requesters, and thereby performance of the memory control system can be improved.

Another object of the present invention is to provide a system and a method for controlling the main memory employing pipeline-controlled bus, by which the logical construction of the memory controller can be simplified and the memory controller can be realized by simple and small hardware.

Another object of the present invention is to provide a system and a method for controlling the main memory employing pipeline-controlled bus, in which RAMs of two or more different cycle times can be employed in the main memory.

In accordance with a first aspect of the present invention, there is provided a memory control system employing pipeline-controlled bus comprising: a main memory including a plurality of banks which are composed of RAM (Random Access Memory); two or more requesters each of which includes an MPU or an I/O means which outputs a request that is addressed to a bank of a main memory; and a pipeline-controlled system bus which connects the main memory and each of the requesters. Each of the requesters includes a request sending control means, a system bus arbitration means, and a bank busy management means. The request sending control means receives the request from the MPU or the I/O means, executes a system bus acquisition request to the system bus arbitration means of the requester itself and system bus arbitration means of other requesters after confirming that the bank to which the request has been addressed is not busy for the request by referring to a bank busy status of the bank which is supplied from the bank busy management means of the requester, and sends the request to the main memory via the pipeline-controlled system bus if the system bus acquisition request could acquire the right to use the pipeline-controlled system bus in consequence of distributed arbitration which is executed by the system bus arbitration means which are provided in each of the requesters. The system bus arbitration means receives the system bus acquisition requests from the request sending control means of the requesters, executes the distributed arbitration between the system bus acquisition requests, informs a request type and a bank number concerning a system bus acquisition request (that could acquire the right to use the pipeline-controlled system bus in consequence of the distributed arbitration) to the bank busy management means of the requester, and informs the request sending control means of the requester that the requester itself could acquire the right to use the pipeline-controlled system bus if the system bus acquisition request from the requester could acquire the right to use the pipeline-controlled system bus in consequence of the distributed arbitration. The bank busy management means stores the bank busy statuses of the banks in the main memory with regard to each of the request types, manages the bank busy statuses of the banks based on the request type and the bank number which are informed by the system bus arbitration means of the requester, and informs the bank busy statuses to the request sending control means. The main memory includes a bank control means for controlling access to the banks according to a request type and an address which are included in the request that is supplied from the request sending control means of the requester via the pipeline-controlled system bus.

In accordance with a second aspect of the present invention, in the first aspect, the bank busy management means includes a read busy control means. The read busy control means masks the bank busy status of a bank with regard to the read request so that a read request can be sent to the bank during the interval between supply of a write request to the bank and supply of write data corresponding to the write request to the bank.

In accordance with a third aspect of the present invention, in the first aspect, the bank busy management means is composed including shift registers corresponding to each of the banks of the main memory. A busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

In accordance with a fourth aspect of the present invention, there is provided a memory control system employing pipeline-controlled bus comprising: a main memory including a plurality of banks which are composed of RAM; two or more requesters each of which includes an MPU or an I/O means which outputs a request that is addressed to a bank of a main memory; and a pipeline-controlled system bus which connects the main memory and each of the requesters. Each of the requesters includes a request sending control means, a system bus arbitration means, a refresh control means, and a bank busy management means. The request sending control means receives the request from the MPU, the I/O means or the refresh control means, executes a system bus acquisition request to the system bus arbitration means of the requester itself and system bus arbitration means of other requesters after confirming that the bank to which the request has been addressed is not busy for the request by referring to a bank busy status of the bank which is supplied from the bank busy management means of the requester, and sends the request to the main memory via the pipeline-controlled system bus if the system bus acquisition request could acquire the right to use the pipeline-controlled system bus in consequence of distributed arbitration which is executed by the system bus arbitration means which are provided in each of the requesters. The system bus arbitration means receives the system bus acquisition requests from the request sending control means of the requesters, executes the distributed arbitration between the system bus acquisition requests, informs a request type and a bank number concerning a system bus acquisition request (that could acquire the right to use the pipeline-controlled system bus in consequence of the distributed arbitration) to the bank busy management means of the requester, and informs the request sending control means of the requester that the requester itself could acquire the right to use the pipeline-controlled system bus if the system bus acquisition request from the requester could acquire the right to use the pipeline-controlled system bus in consequence of the distributed arbitration. The refresh control means controls execution of refresh of the banks in the main memory. The refresh control means outputs a refresh request to the request sending control means when need for refreshing a bank occurred. The bank busy management means stores the bank busy statuses of the banks in the main memory with regard to each of the request types, manages the bank busy statuses of the banks based on the request type and the bank number which are informed by the system bus arbitration means of the requester, and informs the bank busy statuses to the request sending control means. The main memory includes a bank control means for controlling access to the banks according to a request type and an address which are included in the request that is supplied from the request sending control means of the requester via the pipeline-controlled system bus.

In accordance with a fifth aspect of the present invention, in the fourth aspect, the bank busy management means includes a read busy control means. The read busy control means masks the bank busy status of a bank with regard to the read request so that a read request can be sent to the bank during the interval between supply of a write request to the bank and supply of write data corresponding to the write request to the bank.

In accordance with a sixth aspect of the present invention, in the fourth aspect, the bank busy management means is composed including shift registers corresponding to each of the banks of the main memory. A busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

In accordance with a seventh aspect of the present invention, there is provided a memory control system employing pipeline-controlled bus comprising: a main memory including a plurality of banks which are composed of RAM; two or more requesters each of which includes an MPU or an I/O means which outputs a request that is addressed to a bank of a main memory; and a pipeline-controlled system bus which connects the main memory and each of the requesters. Each of the requesters includes a request sending control means, a system bus arbitration means, and a bank busy management means. The request sending control means receives the request from the MPU or the I/O means, executes a system bus acquisition request to the system bus arbitration means of the requester itself and system bus arbitration means of other requesters after confirming that the bank to which the request has been addressed is not busy for the request by referring to a bank busy status of the bank which is supplied from the bank busy management means of the requester, and sends the request to the main memory via the pipeline-controlled system bus if the system bus acquisition request could acquire the right to use the pipeline-controlled system bus in consequence of distributed arbitration which is executed by the system bus arbitration means which are provided in each of the requesters. The system bus arbitration means receives the system bus acquisition requests from the request sending control means of the requesters, executes the distributed arbitration between the system bus acquisition requests, informs a request type and a bank number concerning a system bus acquisition request (that could acquire the right to use the pipeline-controlled system bus in consequence of the distributed arbitration) to the bank busy management means of the requester, and informs the request sending control means of the requester that the requester itself could acquire the right to use the pipeline-controlled system bus if the system bus acquisition request from the requester could acquire the right to use the pipeline-controlled system bus in consequence of the distributed arbitration. The bank busy management means stores the bank busy statuses of the banks in the main memory with regard to each of the request types, manages the bank busy statuses of the banks based on the request type and the bank number which are informed by the system bus arbitration means of the requester and refresh information which is supplied from the main memory via the pipeline-controlled system bus, and informs the bank busy statuses to the request sending control means. The main memory includes a bank control means, a refresh control means, and a subsidiary bank busy management means. The bank control means controls access to the banks according to a request type and an address which are included in the request that is supplied from the request sending control means of the requester via the pipeline-controlled system bus. The refresh control means controls execution of refresh of the banks in the main memory. The refresh control means directly sends the refresh information to the subsidiary bank busy management means in the main memory and sends the refresh information to the bank busy management means in the requesters via the pipeline-controlled system bus when need for refreshing a bank occurred. The refresh control means executes a refresh request to the bank control means when the subsidiary bank busy management means informed the refresh control means that execution of refresh of the bank is possible. The subsidiary bank busy management means stores the bank busy statuses of the banks in the main memory with regard to each of the request types, manages the bank busy statuses of the banks based on the request which is supplied from the requester via the pipeline-controlled system bus and the refresh information which is supplied from the refresh control means, judges whether or not execution of refresh of the bank is possible based on the bank busy statuses, and informs the refresh control means that the execution of refresh of the bank is possible if possible.

In accordance with an eighth aspect of the present invention, in the seventh aspect, the bank busy management means includes a read busy control means. The read busy control means masks the bank busy status of a bank with regard to the read request so that a read request can be sent to the bank during the interval between supply of a write request to the bank and supply of write data corresponding to the write request to the bank.

In accordance with a ninth aspect of the present invention, in the seventh aspect, the bank busy management means is composed including shift registers corresponding to each of the banks of the main memory. A busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

In accordance with a tenth aspect of the present invention, in the seventh aspect, the subsidiary bank busy management means includes a refresh control flip-flop corresponding to each bank of the main memory for holding its status until execution of refresh of the bank becomes possible, and informing the refresh control means that the execution of refresh of the bank has become possible when it became possible.

In accordance with an eleventh aspect of the present invention, there is provided a memory control system employing pipeline-controlled bus comprising: a main memory including a plurality of banks which are composed of RAM; two or more requesters each of which includes an MPU or an I/O means which outputs a request that is addressed to a bank of a main memory; and a pipeline-controlled system bus which connects the main memory and each of the requesters. Each of the requesters includes a request sending control means, a system bus arbitration means, and a bank busy management means. The request sending control means receives the request from the MPU or the I/O means, executes a system bus acquisition request to the system bus arbitration means of the requester itself and system bus arbitration means of other requesters after confirming that the bank to which the request has been addressed is not busy for the request by referring to a bank busy status of the bank which is supplied from the bank busy management means of the requester, and sends the request to the main memory via the pipeline-controlled system bus if the system bus acquisition request could acquire the right to use the pipeline-controlled system bus in consequence of distributed arbitration which is executed by the system bus arbitration means which are provided in each of the requesters. The system bus arbitration means receives the system bus acquisition requests from the request sending control means of the requesters, executes the distributed arbitration between the system bus acquisition requests, informs a request type and a bank number concerning a system bus acquisition request (that could acquire the right to use the pipeline-controlled system bus in consequence of the distributed arbitration) to the bank busy management means of the requester, and informs the request sending control means of the requester that the requester itself could acquire the right to use the pipeline-controlled system bus if the system bus acquisition request from the requester could acquire the right to use the pipeline-controlled system bus in consequence of the distributed arbitration. The bank busy management means stores the bank busy statuses of the banks in the main memory with regard to each of the request types, manages the bank busy statuses of the banks based on the request type and the bank number which are informed by the system bus arbitration means of the requester, refresh information which is supplied from the main memory via the pipeline-controlled system bus and rewriting information which is supplied from the main memory via the pipeline-controlled system bus, and informs the bank busy statuses to the request sending control means. The main memory includes a bank control means, a refresh control means, a rewriting control means, and a subsidiary bank busy management means. The bank control means controls access to the banks according to a request type and an address which are included in the request that is supplied from the request sending control means of the requester via the pipeline-controlled system bus. The refresh control means controls execution of refresh of the banks in the main memory. The refresh control means directly sends the refresh information to the subsidiary bank busy management means in the main memory and sends the refresh information to the bank busy management means in the requesters via the pipeline-controlled system bus when need for refreshing a bank occurred, and executes a refresh request to the bank control means when the subsidiary bank busy management means informed the refresh control means that execution of refresh of the bank is possible. The rewriting control means directly sends the rewriting information to the subsidiary bank busy management means in the main memory and sends the rewriting information to the bank busy management means in the requesters via the pipeline-controlled system bus when a correctable error is found in read data which has been read out from the banks, and executes a rewriting request to the bank control means when the subsidiary bank busy management means informed the rewriting control means that execution of rewriting to the bank is possible. The subsidiary bank busy management means stores the bank busy statuses of the banks in the main memory with regard to each of the request types, manages the bank busy statuses of the banks based on the request which is supplied from the requester via the pipeline-controlled system bus, the refresh information which is supplied from the refresh control means and the rewriting information which is supplied from the rewriting control means, judges whether or not execution of refresh of the bank is possible based on the bank busy statuses, informs the refresh control means that the execution of refresh of the bank is possible if possible, judges whether or not execution of rewriting to the bank is possible based on the bank busy statuses, and informs the rewriting control means that the execution of rewriting the bank is possible if possible.

In accordance with a twelfth aspect of the present invention, in the eleventh aspect, the bank busy management means includes a read busy control means. The read busy control means masks the bank busy status of a bank with regard to the read request so that a read request can be sent to the bank during the interval between supply of a write request to the bank and supply of write data corresponding to the write request to the bank.

In accordance with a thirteenth aspect of the present invention, in the eleventh aspect, the bank busy management means is composed including shift registers corresponding to each of the banks of the main memory. A busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

In accordance with a fourteenth aspect of the present invention, in the eleventh aspect, the subsidiary bank busy management means includes: a refresh control flip-flop corresponding to each bank of the main memory for holding its status until execution of refresh of the bank becomes possible and informing the refresh control means that the execution of refresh of the bank has become possible when it became possible; and a rewriting control flip-flop corresponding to each bank of the main memory for holding its status until execution of rewriting to the bank becomes possible and informing the rewriting control means that the execution of rewriting to the bank has become possible when it became possible.

In accordance with a fifteenth aspect of the present invention, there is provided a method for controlling a main memory which includes a plurality of banks composed of RAM and which is connected via a pipeline-controlled system bus to two or more requesters each of which including an MPU or an I/O means which outputs a request that is addressed to a bank of the main memory. The method comprises a requesting step, a system bus acquisition request step, a system bus arbitration step, a request sending step, and a bank busy management step. In the requesting step, the MPU or the I/O means of the requester outputs a request to a request sending control means of the requester. In the system bus acquisition request step, the request sending control means executes a system bus acquisition request to a system bus arbitration means of the requester itself and system bus arbitration means of other requesters after confirming that the bank to which the request has been addressed is not busy for the request by referring to a bank busy status of the bank which is supplied from a bank busy management means of the requester. In the system bus arbitration step, the system bus arbitration means in the requester executes distributed arbitration between the system bus acquisition requests which have been supplied from the request sending control means of the requesters, informs a request type and a bank number concerning a system bus acquisition request (that could acquire the right to use the pipeline-controlled system bus in consequence of the distributed arbitration) to the bank busy management means of the requester, and informs the request sending control means of the requester that the requester itself could acquire the right to use the pipeline-controlled system bus if the system bus acquisition request from the requester could acquire the right to use the pipeline-controlled system bus in consequence of the distributed arbitration. In the request sending step, the request sending control means sends the request to the main memory via the pipeline-controlled system bus if the system bus acquisition request from the requester could acquire the right to use the pipeline-controlled system bus in the system bus arbitration step. In the bank busy management step, the bank busy management means, which stores the bank busy statuses of the banks in the main memory with regard to each of the request types, manages the bank busy statuses of the banks based on the request type and the bank number which have been informed by the system bus arbitration means of the requester, and informs the bank busy statuses to the request sending control means.

In accordance with a sixteenth aspect of the present invention, in the fifteenth aspect, in the bank busy management step, a read busy control means of the bank busy management means masks the bank busy status of a bank with regard to the read request so that a read request can be sent to the bank during the interval between supply of a write request to the bank and supply of write data corresponding to the write request to the bank.

In accordance with a seventeenth aspect of the present invention, in the fifteenth aspect, the bank busy management means is composed including shift registers corresponding to each of the banks of the main memory, and in the bank busy management step, a busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

In accordance with an eighteenth aspect of the present invention, in the fifteenth aspect, the method further comprises a refresh request step in which a refresh control means in the requester outputs a refresh request to the request sending control means when need for refreshing a bank occurred.

BRIEF DESCRIPTION OF THE DRAWINGS

The objects and features of the present invention will become more apparent from the consideration of the following detailed description taken in conjunction with the accompanying drawings, in which:

FIG. 12 is a block diagram showing detailed composition of a requester which is shown in FIG. 11;

FIG. 14 is a block diagram showing internal composition of a bank busy management unit which is provided in bank busy management sections shown in FIG. 12 and FIG. 13 corresponding to each bank of the main memory of FIG. 13;

FIG. 16 is a timing chart showing the timing for write access which is executed in the memory control systems of the first through fourth embodiments;

FIG. 17 is a timing chart showing the timing for read modify write access which is executed in the memory control systems of the first through fourth embodiments;

FIGS. 18A and 18B are timing charts showing the timing for refresh which is executed in the memory control systems of the third and fourth embodiments;

FIGS. 19A and 19B are timing charts showing the timing for rewriting access which is executed in the memory control system of the fourth embodiment; and FIG. 20A through FIG. 20E are timing charts showing the timing of the memory control systems of the first through fourth embodiments, in the case where a read request is sent to a bank after a write request is sent to the same bank.

DESCRIPTION OF THE PREFERRED EMBODIMENTS

Figure 1:
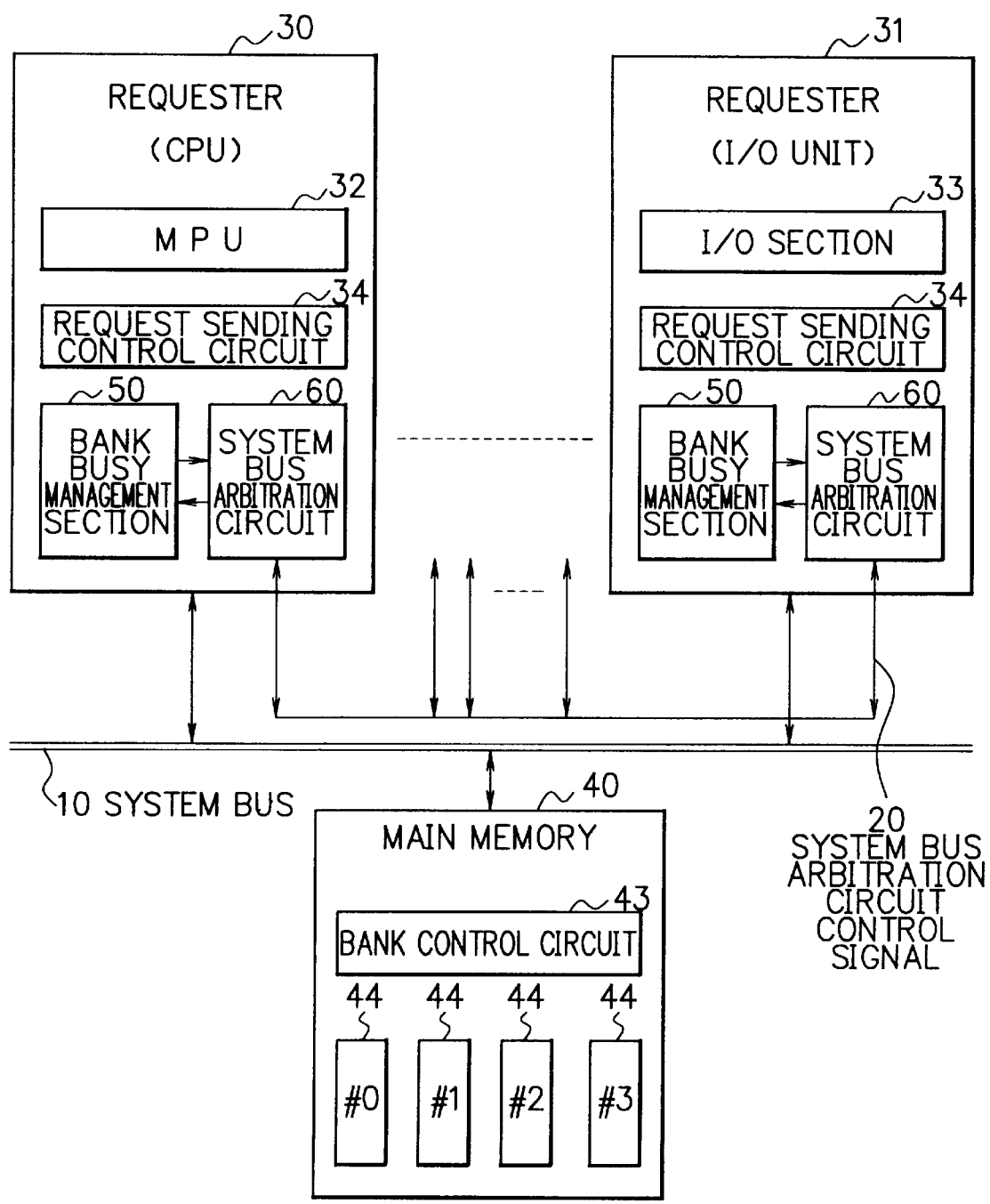
FIG. 1 is a schematic block diagram showing a memory control system employing pipeline-controlled bus according to a first embodiment of the present invention.

Referring now to the drawings, a description will be given in detail of preferred embodiments in accordance with the present invention.

FIG. 1 is a schematic block diagram showing a memory control system employing pipeline-controlled bus according to a first embodiment of the present invention. The main part of the memory control system of the first embodiment is composed of one or more CPUs (hereafter referred to as "requesters 30"), one or more I/O units (hereafter referred to as "requesters 31") and a main memory 40 which are connected together by a system bus 10 which is a pipeline-controlled bus. Each of the requesters is connected to the main memory 40 via the system bus 10.

The requester 30 is composed of an MPU (MicroProcessor Unit) 32, a request sending control circuit 34 for receiving requests from the MPU 32 and controlling sending of the requests to the system bus 10, a bank busy management section 50 for indicating and managing bank busy statuses of banks 44 in the main memory 40, and a system bus arbitration circuit 60 for executing arbitration of the system bus 10 by means of distributed arbitration.

The requester 31 is composed of an I/O section 33 provided with an I/O port and I/O interface a request sending control circuit 34 for receiving requests from the I/O section 33 and controlling sending of the requests to the system bus 10, a bank busy management section 50 for indicating and managing bank busy statuses of banks 44 in the main memory 40, and a system bus arbitration circuit 60 for executing arbitration of the system bus 10 by means of distributed arbitration. Incidentally, the same reference character is used for the same or corresponding components in the requester 30 and the requester 31, for the sake of brevity of the following explanation.

The system bus arbitration circuits 60 in the requesters 30 and 31 are connected together by use of a system bus arbitration circuit control signal 20. A requester 30 or 31 which needs to use the system bus 10 executes a system bus acquisition request by use of the system bus arbitration circuit control signal 20, by informing the system bus arbitration circuits 60 in the requesters 30 and 31 about the bank number of a bank 44 to which the requester 30 or 31 needs to send a request, and a request type (read request, write request, read modify write request, etc.) of the request. The right to use the system bus 10 is given to only one requester 30 or 31 according to the result of the arbitration between the system bus arbitration circuits 60.

Figure 2:
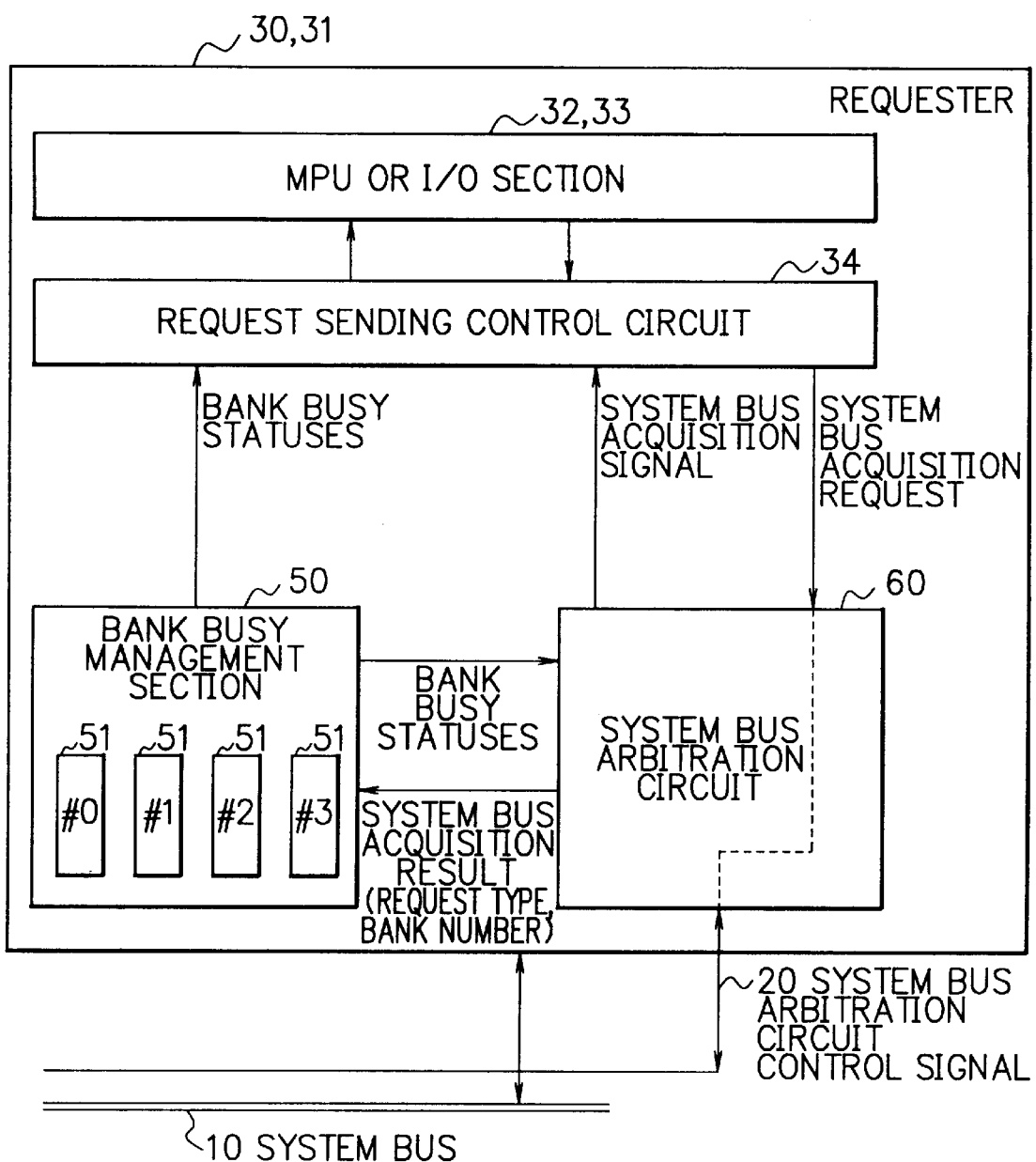
FIG. 2 is a block diagram showing detailed composition of a requester which is provided in the memory control system of FIG. 1.

FIG. 2 is a block diagram showing detailed composition of the requester 30 and the requester 31. In the bank busy management section 50, a plurality of bank busy management units 51 are provided corresponding to each of the banks 44 in the main memory 40.

Figure 3:
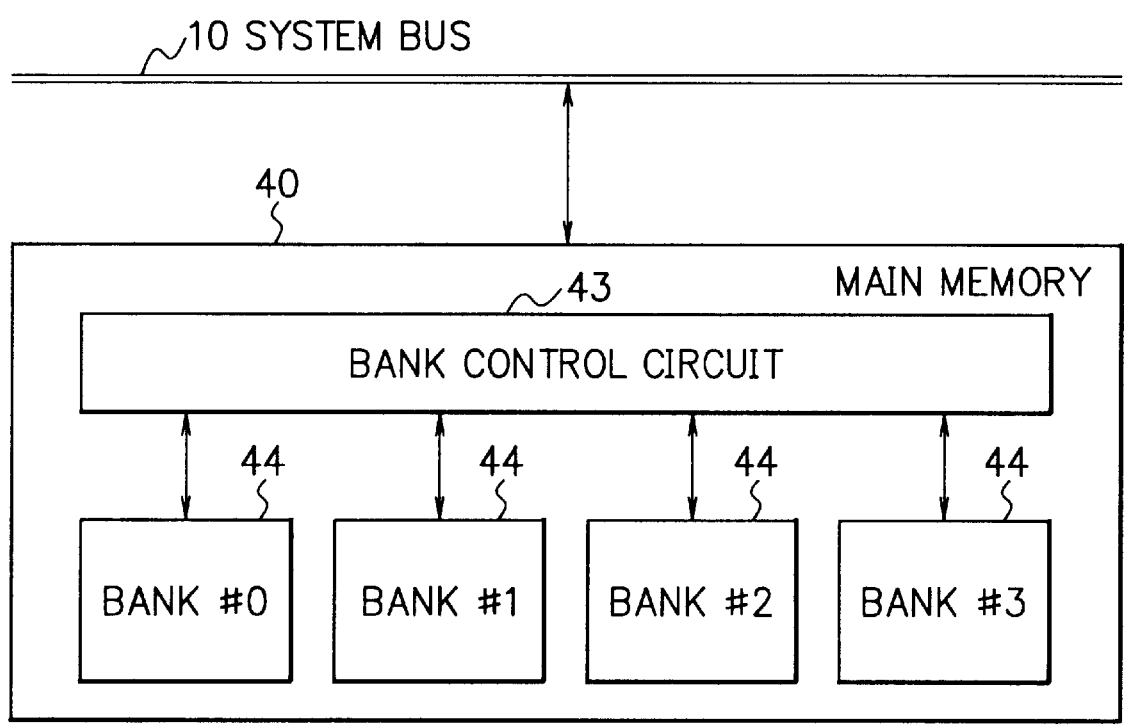
FIG. 3 is a block diagram showing detailed composition of a main memory which is provided in the memory control system of FIG. 1.

FIG. 3 is a block diagram showing detailed composition of the main memory 40. The main memory 40 shown in FIG. 3 is composed of a bank control circuit 43 for controlling access to the banks 44, and a plurality of banks 44 composed of DRAM (Dynamic Random Access Memory), for example. Access to a bank 44 is executed according to a request type and an address which are included in a request that is supplied from a requester 30 or 31 via the system bus 10.

Figure 4:
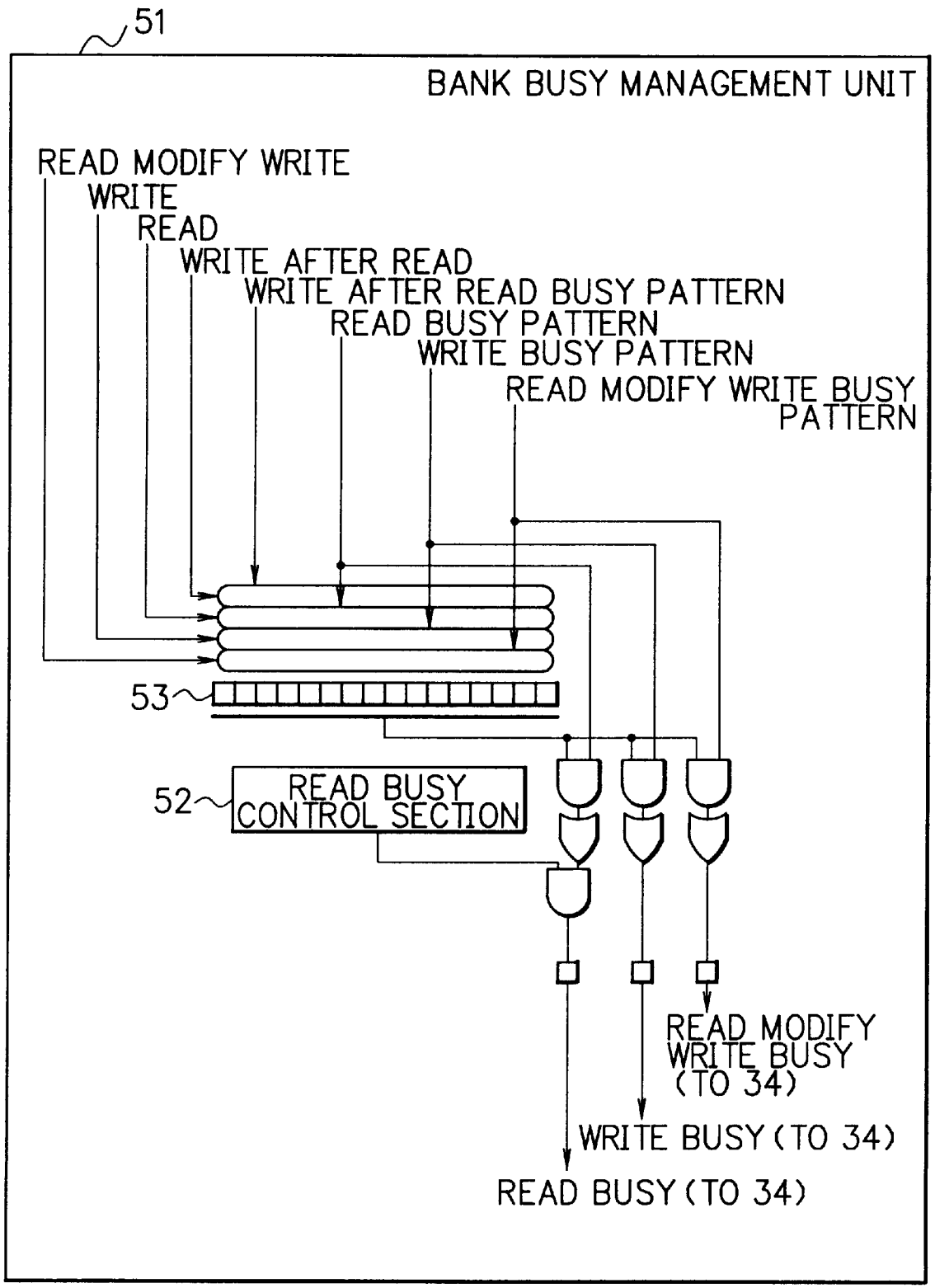
FIG. 4 is a block diagram showing internal composition of a bank busy management unit which is provided in a bank busy management section of the requester of FIG. 2 corresponding to each bank of the main memory of FIG. 3.

FIG. 4 is a block diagram showing internal composition of the bank busy management unit 51 which is provided in the bank busy management section 50 corresponding to each of the banks 44 of the main memory 40. The bank busy management units 51 for each of the banks 44 have the same circuit composition. One of the bank busy management units 51 corresponding to a bank 44 is selected for being operated (modified), according to a bank number which is supplied from the system bus arbitration circuit 60. Busy management of the bank 44 corresponding to the bank busy management unit 51 is executed using a shift register 53 in the bank busy management unit 51 which is shown in FIG. 4. A plurality of fixed busy patterns corresponding to each request type are prestored in registers, and a busy pattern corresponding to a request type which is supplied from the system bus arbitration circuit 60 is copied from one of the registers to the shift register 53. In this embodiment, 3 pulses of a system bus clock signal corresponds to one cycle of the system bus 10, and the shift register 53 executes bit shifting on each cycle of the system bus 10, therefore, the copied busy pattern corresponding to the particular request type is shifted on every cycle of the system bus 10 (i.e. on every 3 pulses of the system bus clock signal). Here, various kinds of RAMs can be used for the banks 44 of the main memory 40, and a busy pattern corresponding to a particular request type ("read", for example) varies depending on the RAM, that is, a busy pattern of a DRAM A corresponding to the read request is different from a busy pattern of an SRAM B corresponding to the same read request. However, in this embodiment, a busy pattern for a specific RAM which is used for the bank 44 can be prestored arbitrarily in the aforementioned register, and thus any type of RAM can be used for the bank 44. It is also possible to realize each of the banks 44 of the main memory 40 employing RAMs having different types and different cycle times. The shift register is utilized for detecting busy statuses of the bank 44 with regard to each of the request types. The busy status of the bank 44 with regard to a particular request type ("read", for example) is detected by judging whether or not overlap between the current pattern of the shift register 53 and a busy pattern (corresponding to the particular request type which has been preset in the aforementioned register) exists. The busy pattern is a time sequence which is expressed by "0"s and "1"s. The time sequence is defined from the moment when the request is sent to the system bus 10 (the origin in time), for example. In the busy pattern, periods in which the bank 44 should be used for the request of the particular request type are expressed by "1"s. Therefore, in the detection of the busy status of the bank 44, AND operations between each bit of the shift register 53 and corresponding each bit of the busy pattern corresponding to the particular request type are executed, and it is judged that the request can not be sent to the bank 44 (i.e. the bank 44 is busy for the request) if the results of the AND operations included one or more "1"s. Referring to FIG. 4, AND gates for executing the AND operations are represented by only one AND gate for brevity, and an OR gate for judging whether or not one or more "1"s are included in the results of the AND operations is shown. The detection of the busy status of the bank 44 is executed with regard to each of the request types, and the result varies depending on the request type. Therefore, there is a case, for example, where the bank 44 is busy for a read request but not busy for a write request and thus only the write request can be sent to the bank 44. The busy statuses with regard to each of the request types (i.e. a read busy status, a write busy status, and a read modify write busy status) are outputted to the request sending control circuit 34. The request sending control circuit 34 is supplied with the busy statuses (with regard to each of the request types) of all the banks 44 from the bank busy management units 51 in the bank busy management section 50.

Incidentally, there are cases where a requester 30 or 31 first sends a write request to an address of a bank 44 of the main memory 40 and then sends a read request to the same address of the same bank 44 just after the write request in order to verify that the write request could successfully be completed, that is, in order to verify that write data could successfully be written to the address of the bank 44 of the main memory 40. In such cases, the read request should not be executed before the write request is completed. If the read request is executed before the write request is completed (for example, between sending of the write request and arrival of write data to the main memory 40) in order to improve communication efficiency, wrong data (data before writing the write data) is read out from the address and thus the verification can not be executed correctly. Therefore, memory control systems should be designed so that the bank 44 will become busy for such a read request just after a write request, and thus no read request can be sent to a bank 44 in the interval between sending of a write request to the same bank 44 and completion of the write request. The read busy control section 52 of the first embodiment is provided in order to solve the problem. The read busy control section 52 shown in FIG. 4 does not let the bank busy management unit 51 show the read busy status of the bank 44 directly, but masks (to "0") the read busy status of the bank 44 during the interval in which the bank 44 can actually receive the read request, that is, during the interval between sending of the write request to the bank 44 and sending of the write data to the bank 44. The read busy control section 52 is constructed including a counter etc., and detects the interval by monitoring the status of the shift register 53 and write requests. Referring to FIG. 4, the read busy control section 52 masks the read busy status of the bank 44 during the interval, by supplying "0" to an AND gate which is shown below the OR gate and thereby fixing the output of the AND gate to "0" during the interval. In short, the read busy control section 52 controls the read busy status of the bank 44 so that the read request can be sent to the bank 44 even if a write request has already been sent to the bank 44 and the request has not been completed yet, in order to utilize the bank 44 efficiently. Incidentally, the sending of such a read request (which occurred just after the write request) utilizing the masking by the read busy control section 52 is not executed if the read request has been addressed to the same address as that of the previous write request, in order to secure correct execution of the aforementioned verification. Generally, the request sending control circuit 34 of the each requester grasps request sending statuses (request types and addresses concerning the requests) of its own and other requesters 30 and 31, by snooping on (i.e. monitoring) the system bus 10, and the request sending control circuit 34 does not execute the system bus acquisition request at once with regard to such a read request that is addressed to the same address as that of the previous write request. The request sending control circuit 34 executes the bus acquisition request with regard to the read request after the write busy status disappeared.

In the following, the operation of the memory control system employing pipeline-controlled bus according to the first embodiment of the present invention will be described.

In the requester 30 or the requester 31, when a request is supplied from the MPU 32 or the I/O section 33 to the request sending control circuit 34, the request sending control circuit 34 refers to the busy statuses of the banks 44 of the main memory 40 which are supplied from the bank busy management section 50, and if the bank 44 to which the request should be sent is not busy, the request sending control circuit 34 executes the system bus acquisition request to the system bus arbitration circuit 60.

When the system bus acquisition request by the request sending control circuit 34 occurred, the system bus arbitration circuit 60 sends out the system bus acquisition request to other requesters 30 and 31 by use of the system bus arbitration circuit control signal 20. Meanwhile, the system bus arbitration circuit 60 also receives system bus acquisition requests from other requesters 30 and 31. Arbitration between the system bus acquisition requests is executed by the system bus arbitration circuits 60 by means of distributes arbitration, and the right to use the system bus 10 is given to a system bus acquisition request from a requester 30 or 31 which has been determined by the arbitration. In the requester 30 or 31 which could acquire the right to use the system bus 10, the system bus arbitration circuit 60 sends a system bus acquisition signal to the request sending control circuit 34 and thereby informs the request sending control circuit 34 about the acquisition of the system bus 10. If the system bus acquisition signal is supplied from the system bus arbitration circuit 60, the request sending control circuit 34 sends out the request to the system bus 10.

Meanwhile, the system bus arbitration circuit 60 informs the bank busy management section 50 about the request type and the bank number concerning the request that acquired the system bus 10, regardless of whether or not the requester 30 or 31 itself could successfully acquire the system bus 10.

The bank busy management section 50 which received the request type and the bank number concerning the request (that acquired the system bus 10) executes busy management of the banks 44 of the main memory 40 based on the request type and the bank number. Concretely, in the bank busy management section 50, the bank busy management unit 51 corresponding to the bank number sets (copies) a busy pattern corresponding to the request type into its shift register 53. The bank busy management unit 51 executes the detection of overlap between the shift register 53 and each of the busy patterns corresponding to the request types, and thereby outputs the busy status of the bank 44 with regard to each of the request types to the request sending control circuit 34. By the procedures described above, the bank busy management sections 50 in each of the requesters 30 and 31 are operated in the same way to have the same internal statuses. Meanwhile, the read busy control section 52 controls the read busy status of the bank 44 so that read requests can be sent to the bank 44 even if a write request has already been sent to the bank 44 and the request has not been completed yet (i.e. during the interval between sending of the write request to the bank 44 and sending of the write data to the bank 44), in order to utilize the bank 44 efficiently.

When the main memory 40 received the request (i.e. the request type and the address) via the system bus 10, access to a bank 44 is executed by the bank control circuit 43 according to the request type and the address. In the case where the request type is "read", the bank control circuit 43 reads out data from the address of a bank 44 corresponding to the address and sends out the read data to the system bus 10 a predetermined period (which has been predetermined for the pipeline-controlled system bus 10) after the read request. If the request type is "write", the bank control circuit 43 receives write data from the requester 30 via the system bus 10 and writes the write data to the address of a bank 44 corresponding to the address a predetermined period (which has been predetermined for the pipeline-controlled system bus 10) after the write request. Here, the bank control circuit 43 which received the write request can not execute the writing (i.e. write access to the bank 44) until it receives the write data via the system bus 10. If the bank control circuit 43 received a read request which has been sent to the same bank 44 during the interval between the arrival of the write request and the arrival of the write data, the bank control circuit 43 executes access due to the read request first. In the case where read busy of the bank 44 due to execution of the read request overlaps with write busy due to the write request, execution of the write request is suspended until the read request is completed as shown in "DRAM OPERATION" of FIG. 20C through FIG. 20E.

As described above, in the memory control system employing pipeline-controlled bus according to the first embodiment of the present invention, each of the bank busy management section 50 in the requesters 30 and 31 grasps and manages bank busy statuses of the banks 44 in the main memory 40 with regard to each of the request types. The request sending control circuit 34 refers to the bank busy statuses of the banks 44 which are supplied from the bank busy management section 50, executes the system bus acquisition request if a bank 44 to which the request from the MPU 32 or the I/O section 33 has been addressed is not busy for the request, and sends the request to the bank 44 if the system bus acquisition request concerning the request could acquire the right to use the pipeline-controlled system bus 10 in consequence of the distributed arbitration which is executed by each of the system bus arbitration circuit 60s. The bank busy statuses of the banks 44 which are grasped by the bank busy management section 50 are managed (modified) according to the request type and the bank number concerning the system bus acquisition request which could acquire the pipeline-controlled system bus 10 in consequence of the distributed arbitration by the system bus arbitration circuit 60.

Therefore, the requesters 30 and 31 which grasp the bank busy statuses do not send void requests to system bus 10, and thereby performance of a memory control system is improved due to the efficient use of the system bus 10.

In addition, due to the employment the pipeline-controlled system bus 10, the bank control circuit 43 (the aforementioned memory controller) in the main memory 40 no more has to be involved in the arbitration for acquiring the right to use the system bus 10. And the bank control circuit 43 is not required to be provided with buffers for temporarily storing addresses and data, since busy management of the banks 44 of the main memory 40 is executed on the side of the requesters. Therefore, the main memory 40 can be realized by considerably simple logical construction and small hardware.

Further, due to the masking of the read busy status by the read busy control section 52, the read request to the same bank 44 just after a write request can be sent to the bank 44. Therefore, usage efficiency of the banks 44 of the main memory 40 in the system employing the pipeline-controlled bus can be improved and thereby performance of the system can be increased.

Furthermore, the busy management of the banks 44 of the main memory is executed by use of the shift registers 53. The busy patterns which are prestored in the aforementioned registers with regard to each of the request types can be predetermined arbitrarily so as to fit the specific RAM that is used for the bank 44. Therefore, any types of RAMs having various cycle times can be employed for the banks 44 of the main memory 40. It is also possible to realize each of the banks 44 of the main memory 40 employing RAMs having different types and different cycle times.

Figure 5:
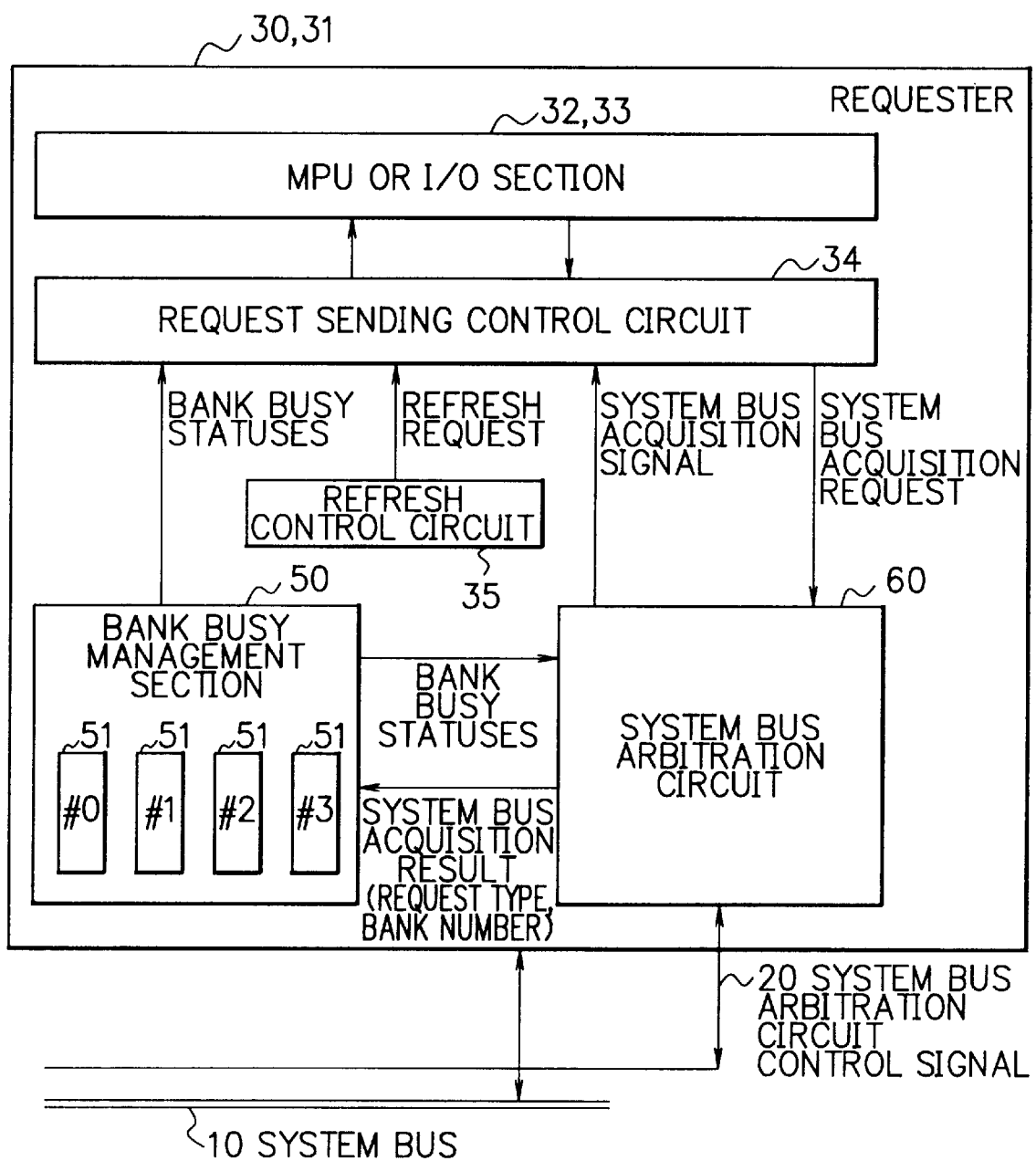
FIG. 5 is a block diagram showing detailed composition of a requester which is provided in a memory control system employing pipeline-controlled bus according to a second embodiment of the present invention.

FIG. 5 is a block diagram showing detailed composition of a requester 30 or 31 which is provided in a memory control system employing pipeline-controlled bus according to a second embodiment of the present invention. The requester 30 or 31 of the second embodiment is realized by adding a refresh control circuit 35 to the requester 30 or 31 of the first embodiment. The refresh control circuit 35 controls execution of refresh of the banks 44 in the main memory 40.

Figure 6:
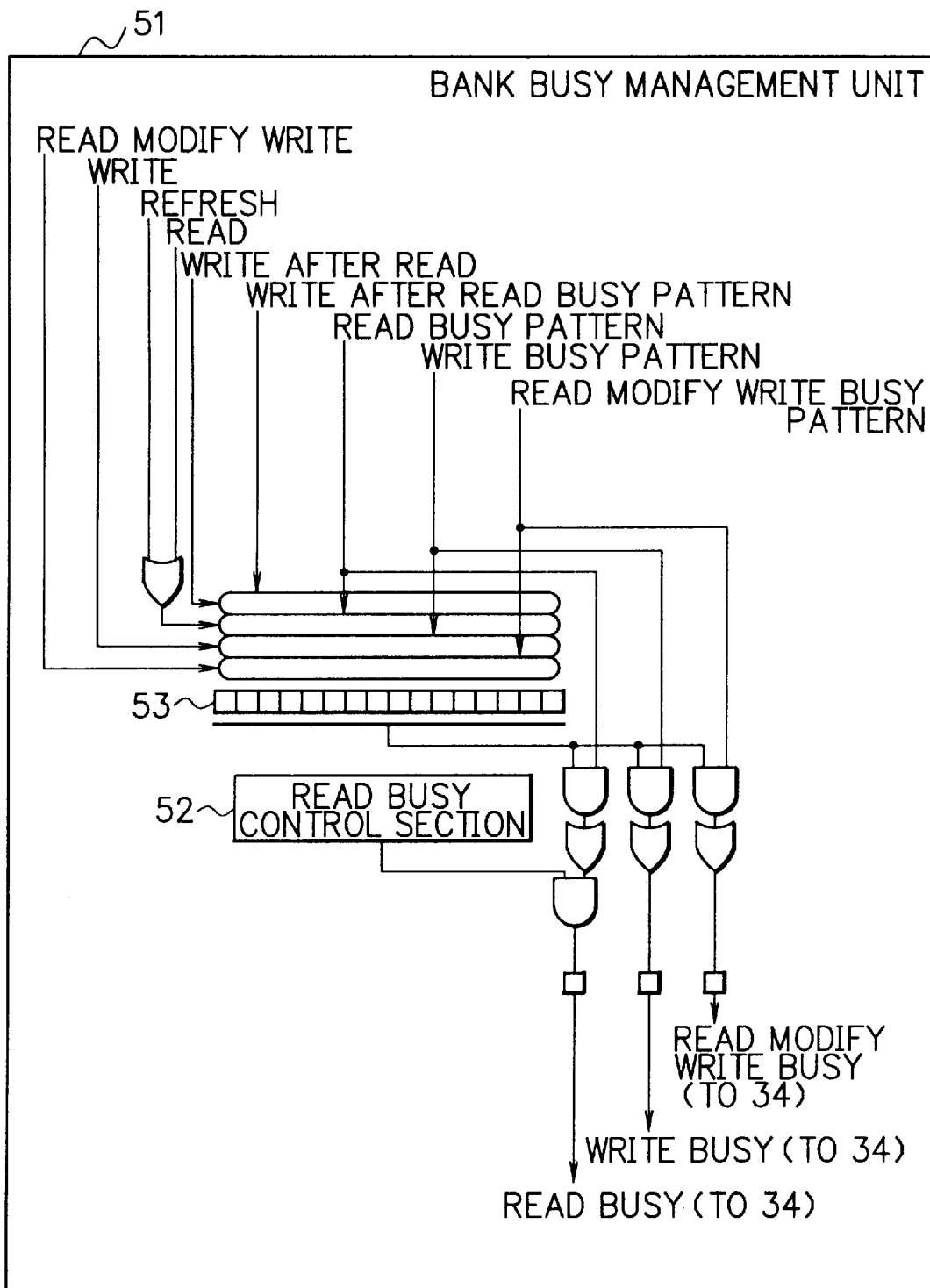
FIG. 6 is a block diagram showing internal composition of a bank busy management unit which is provided in a bank busy management section of the requester of FIG. 5 corresponding to each bank of the main memory.

FIG. 6 is a block diagram showing internal composition of a bank busy management unit 51 of the second embodiment which is provided in the bank busy management section 50 corresponding to each of the banks 44 of the main memory 40. The bank busy management units 51 for each of the banks 44 have the same circuit composition. One of the bank busy management units 51 to be operated (modified) is selected, according to a bank number which is supplied from the system bus arbitration circuit 60. Busy management of the bank 44 corresponding to the bank busy management unit 51 is executed using a shift register 53 in the bank busy management unit 51 which is shown in FIG. 6. A plurality of fixed busy patterns corresponding to each request type are prestored in registers, and a busy pattern corresponding to a request type which is supplied from the system bus arbitration circuit 60 is copied from one of the registers to the shift register 53. Also in this embodiment, 3 pulses of a system bus clock signal corresponds to one cycle of the system bus 10, and the copied busy pattern corresponding to the particular request type is shifted on every cycle of the system bus 10 (on every 3 pulses of the system bus clock signal). As mentioned before, the busy patterns which are prestored in the aforementioned registers with regard to each of the request types can be predetermined arbitrarily so as to fit the specific RAM that is used for the bank 44. Therefore, any types of RAMs having various cycle times can be employed for the banks 44 of the main memory 40, and it is also possible to realize each of the banks 44 of the main memory 40 employing RAMs having different types and different cycle times. The shift register is utilized for detecting busy statuses of the bank 44 with regard to each of the request types. The busy status of the bank 44 with regard to a particular request type ("read", for example) is detected by judging whether or not overlap between the current pattern of the shift register 53 and a busy pattern (corresponding to the particular request type which has been preset in the aforementioned register) exists. The busy pattern is a time sequence which is expressed by "0"s and "1"s that have been defined from the moment when the request is sent to the system bus 10, for example. Periods in the busy pattern in which the bank 44 should be used for the request of the particular request type are expressed by "1"s. In the detection of the busy status of the bank 44, AND operations between each bit of the shift register 53 and corresponding each bit of the busy pattern corresponding to the particular request type are executed by the AND gates (which are represented in FIG. 6 by only one AND gate for brevity), and OR operation between the results from the AND gates is executed by the OR gate which is shown in FIG. 6, and it is judged that the bank 44 is busy for the request if the results of the OR operation is "1". The detection of the busy status of the bank 44 is executed with regard to each of the request types, and the result varies depending on the request type. The busy statuses with regard to each of the request types (i.e. a read busy status, a write busy status, and a read modify write busy status) are outputted to the request sending control circuit 34. The request sending control circuit 34 is supplied with the busy statuses (with regard to each of the request types) of all the banks 44 from the bank busy management units 51 in the bank busy management section 50.

In the same way as the first embodiment, the read busy control section 52 shown in FIG. 6 does not let the bank busy management unit 51 show the read busy status of the bank 44 directly, but masks (to "0") the read busy status of the bank 44 during the interval between sending of the write request to the bank 44 and sending of the write data to the bank 44. The read busy control section 52 which is constructed including a counter etc. detects the interval by monitoring the status of the shift register 53 and write requests. The read busy control section 52 masks the read busy status of the bank 44 during the interval, by supplying "0" to the AND gate which is shown in FIG. 6 below the OR gate and thereby fixing the output of the AND gate to "0" during the interval. Due to the masking of the read busy status by the read busy control section 52, the read request can be sent to the bank 44 even if a write request has already been sent to the bank 44 and the request has not been completed yet, thereby the bank 44 is utilized efficiently. The sending of such a read request (which occurred just after the write request) utilizing the masking by the read busy control section 52 is not executed if the read request has been addressed to the same address as that of the previous write request, in order to secure correct execution of the aforementioned verification. The request sending control circuit 34 of the each requester grasps request sending statuses (request types and addresses concerning the requests) of its own and other requesters 30 and 31, by snooping on the system bus 10, and the request sending control circuit 34 does not execute the system bus acquisition request at once with regard to such a read request that is addressed to the same address as that of the previous write request. The request sending control circuit 34 executes the bus acquisition request with regard to the read request after the write busy status disappeared.

Referring again to FIG. 6, another OR gate is shown above the shift register 53. In the second embodiment, the busy pattern for the request type "read" which is prestored in the aforementioned register is also used as a busy pattern for a request type "refresh", in other words, the refresh busy pattern of the bank 44 is the same as the read busy pattern of the bank 44. In the case where a request type "refresh" is supplied to the bank busy management unit 51 from the system bus arbitration circuit 60, the refresh busy pattern which is the same as the read busy pattern is selected and copied to the shift register 53 due to the OR operation by the OR gate.

In the following, the operation of the memory control system employing pipeline-controlled bus according to the second embodiment of the present invention will be described, mainly on the difference from the first embodiment.

The refresh control circuits 35 in the requesters 30 and 31 operate in the same way. The refresh control circuit 35 controls execution of refresh of the banks 44 in the main memory 40. When need for refreshing a bank 44 occurred, the refresh control circuits 35 executes a refresh request to the request sending control circuit 34 using the bank number of the bank 44 which needs to be refreshed.

The request sending control circuit 34 which received the refresh request from the refresh control circuit 35 confirms that the bank 44 corresponding to the bank number is not busy, by referring to the bank busy status of the bank 44 which is supplied from the bank busy management section 50, and then executes the system bus acquisition request to the system bus arbitration circuit 60.

When the system bus acquisition request by the request sending control circuit 34 occurred, the system bus arbitration circuit 60 sends out the system bus acquisition request to other requesters 30 and 31 by use of the system bus arbitration circuit control signal 20. Meanwhile, the system bus arbitration circuit 60 also receives system bus acquisition requests from other requesters 30 and 31. Arbitration between the system bus acquisition requests is executed by the system bus arbitration circuits 60 by means of distributes arbitration, and the right to use the system bus 10 is given to a system bus acquisition request from a requester 30 or 31 which has been determined by the arbitration. In the requester 30 or 31 which could acquire the right to use the system bus 10, the system bus arbitration circuit 60 informs the request sending control circuit 34 about the acquisition of the system bus 10, and the request sending control circuit 34 sends the refresh request to the system bus 10 as an ordinary request such as the read request etc.

Meanwhile, the system bus arbitration circuit 60 informs the bank busy management section 50 about the request type and the bank number concerning the request that acquired the system bus 10, regardless of whether or not the requester 30 or 31 itself could successfully acquire the system bus 10.

The bank busy management section 50 which received the request type and the bank number concerning the request (that acquired the system bus 10) executes busy management of the banks 44 of the main memory 40 based on the request type and the bank number. Concretely, in the bank busy management section 50, the bank busy management unit 51 corresponding to the bank number sets (copies) a busy pattern corresponding to the request type into its shift register 53. Here, if the request type supplied from the system bus arbitration circuit 60 is "refresh", the refresh busy pattern which is the same as the read busy pattern is set into the shift register 53. The bank busy management unit 51 executes the detection of overlap between the shift register 53 and each of the busy patterns corresponding to the request types, and thereby outputs the busy statuses of the bank 44 with regard to each of the request types to the request sending control circuit 34. By the procedures described above, the bank busy management sections 50 in each of the requesters 30 and 31 are operated in the same way to have the same internal statuses. Meanwhile, the read busy control section 52 controls the read busy status of the bank 44 so that read requests can be sent to the bank 44 even if a write request has already been sent to the bank 44 and the request has not been completed yet (i.e. during the interval between sending of the write request to the bank 44 and sending of the write data to the bank 44), in order to utilize the bank 44 efficiently.

If the main memory 40 received the refresh request (i.e. the request type and the address) via the system bus 10, access to the bank 44 is executed by the bank control circuit 43 according to the request type and the address, and thereby the bank 44 is refreshed.

As described above, in the memory control system employing pipeline-controlled bus according to the second embodiment of the present invention, the refresh control circuit 35 is provided to each of the requesters 30 and 31 and the refresh busy pattern which is the same as the read busy pattern is utilized for management of the bank busy statuses of the banks 44. Therefore, as well as the same effects as those of the first embodiment can be obtained, control of refresh of the banks 44 of the main memory 40 can be executed according to determination by the requesters 30 and 31. By providing the capability of refresh control to the side of the requesters 30 and 31, the main memory 40 can be realized with simple composition and small hardware.

Figure 7:
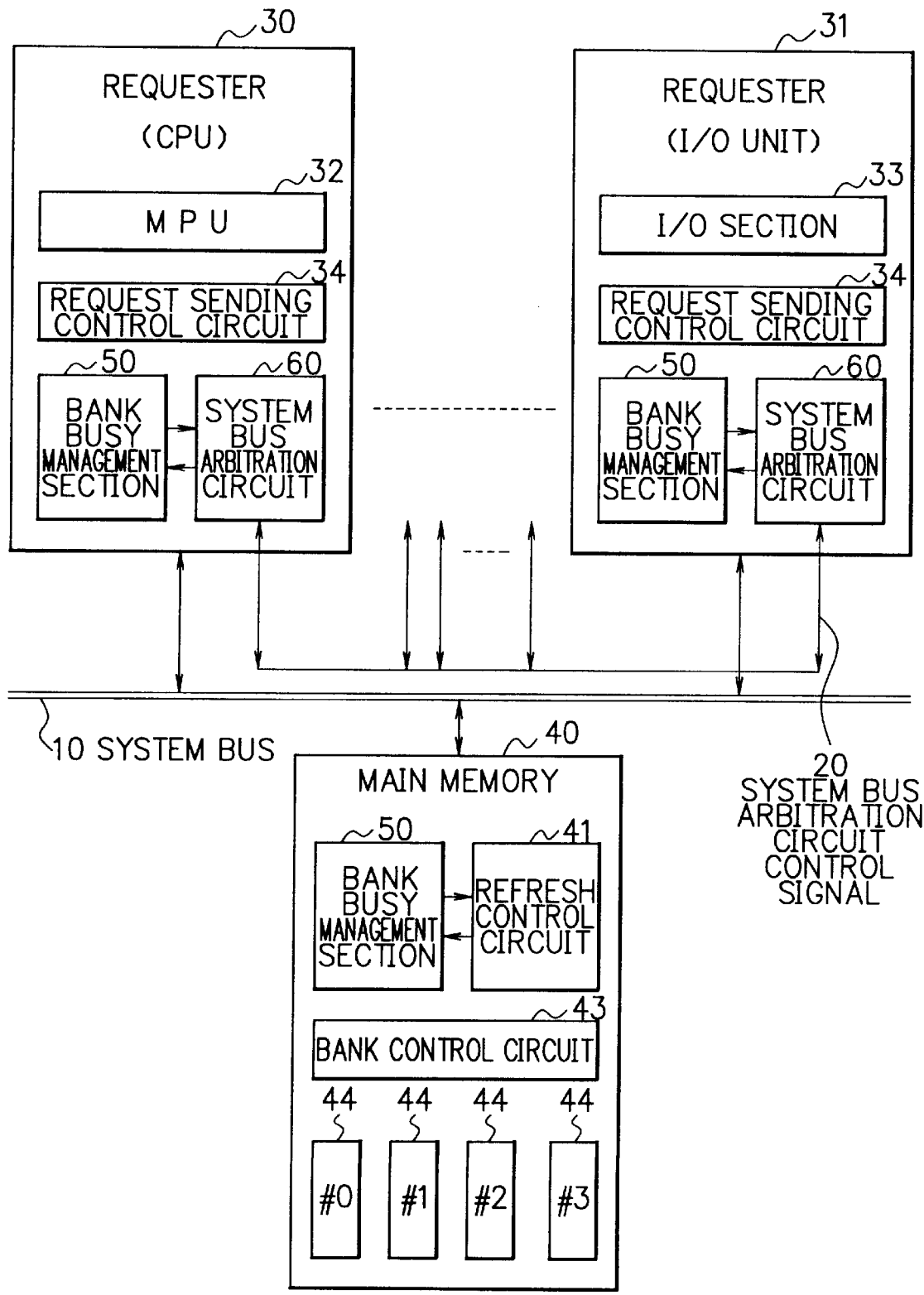
FIG. 7 is a schematic block diagram showing a memory control system employing pipeline-controlled bus according to a third embodiment of the present invention.

FIG. 7 is a schematic block diagram showing a memory control system employing pipeline-controlled bus according to a third embodiment of the present invention. In the memory control system of the third embodiment, a main memory 40 is realized by adding a refresh control circuit 41 and a bank busy management section 50 to the main memory 40 of the first embodiment which has been shown in FIG. 1 and FIG. 3. In other words, the main memory 40 of the third embodiment is composed of the bank control circuit 43, the banks 44, the bank busy management section 50 and the refresh control circuit 41. The refresh control circuit 41 of the third embodiment is different from the refresh control circuit 35 of the second embodiment in that refresh control circuit 41 is provided to the main memory 40. The refresh control circuit 41 controls refresh intervals of the banks 44 of the main memory 40. In the third embodiment, the bank busy management section 50 in the main memory 40 has the same circuit composition as the bank busy management section 50 in the requesters 30 and 31.

Figure 8:
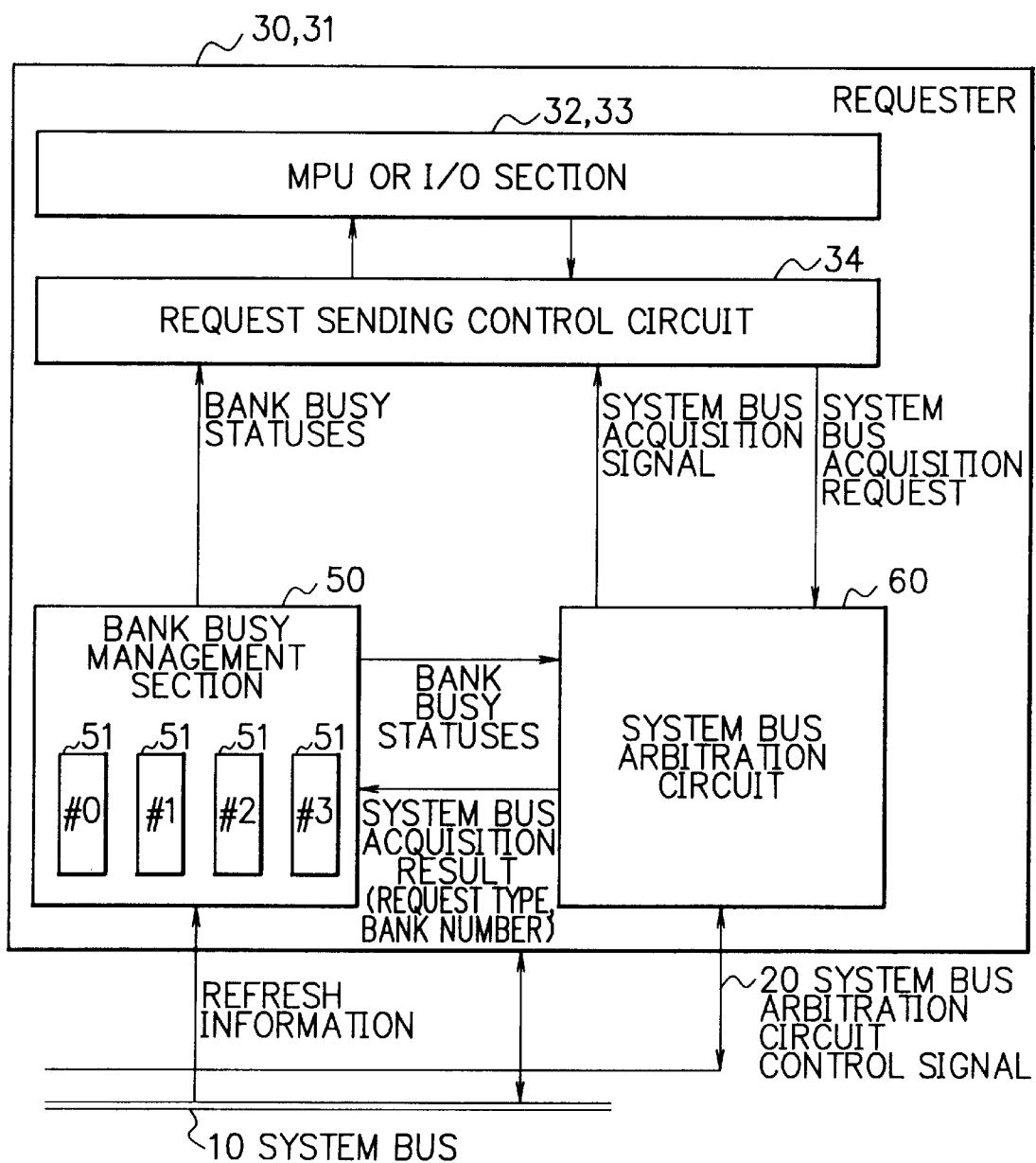
FIG. 8 is a block diagram showing detailed composition of a requester which is shown in FIG. 7.

FIG. 8 is a block diagram showing detailed composition of the requester 30 and the requester 31 which are shown in FIG. 7. As shown in FIG. 8, the requester 30 and the requester 31 of the third embodiment are basically the same as those of the first embodiment which have been shown in FIG. 2, except that refresh information indicating that the refresh control circuit 41 is going to execute refresh is supplied to the bank busy management section 50 of the requester via the system bus 10.

Figure 9:
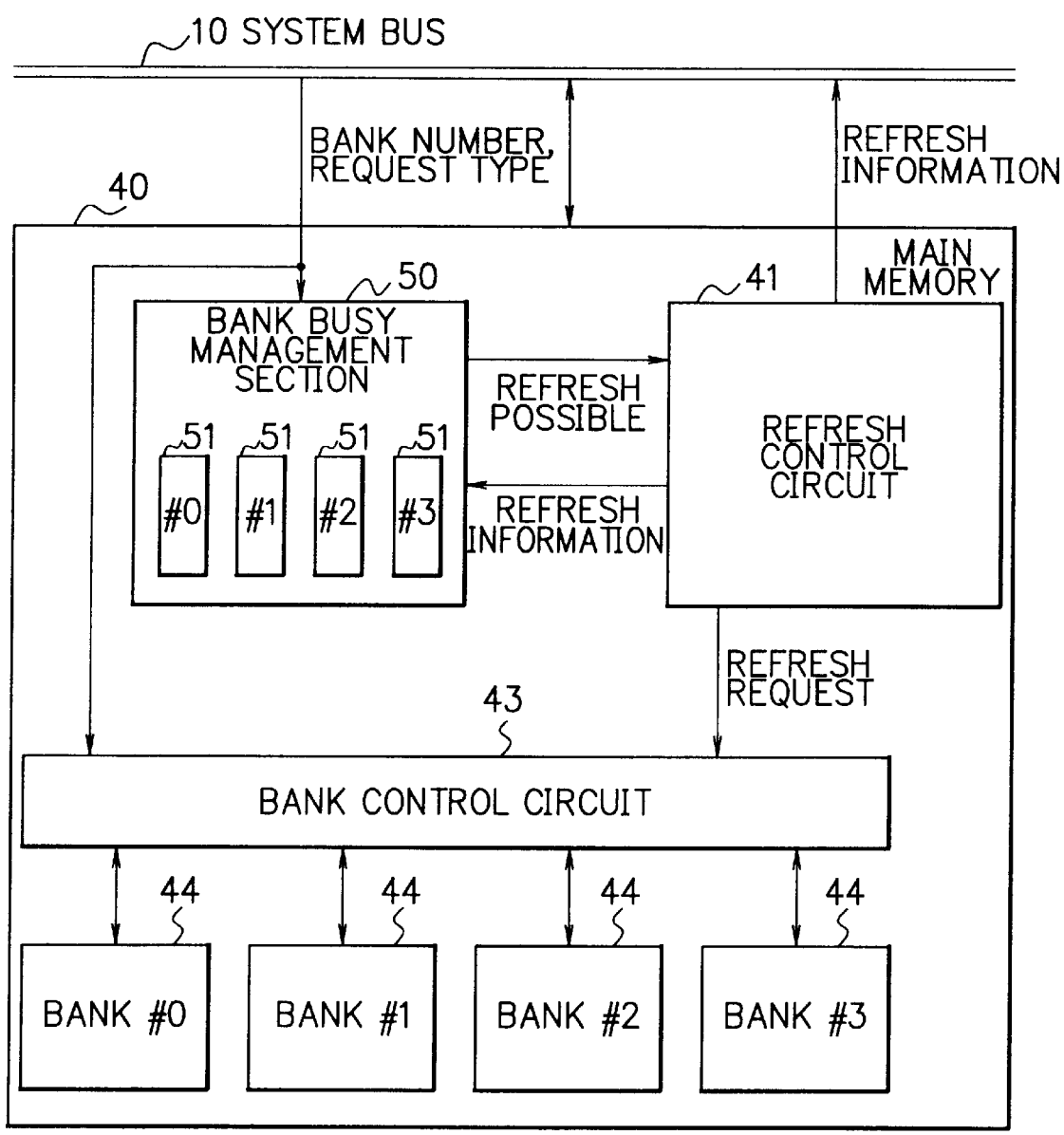
FIG. 9 is a block diagram showing detailed composition of a main memory which is shown in FIG. 7.

FIG. 9 is a block diagram showing detailed composition of the main memory 40 which is shown in FIG. 7. The main memory 40 shown in FIG. 9 further includes the bank busy management section 50 and the refresh control circuit 41 in comparison with the main memory 40 of the first embodiment which has been shown in FIG. 3. In other words, the main memory 40 of the third embodiment is composed of the bank control circuit 43 for controlling access to the banks 44, the refresh control circuit 41 for instructing execution of the refresh, the banks 44 composed of DRAM etc., and the bank busy management section 50 for indicating and managing bank busy statuses of the banks 44 based on a request type and an address which are supplied via the system bus 10.

The bank busy management section 50 in the main memory 40 has the same circuit composition as the bank busy management section 50 in the requesters 30 and 31 as mentioned above, and operates just 1 cycle after the bank busy management section 50 in the requesters 30 and 31. The bank busy management section 50 in the main memory 40 operates according to requests which are supplied via the system bus 10. The bank busy management section 50 in the main memory 40 of the third embodiment is utilized only for determining timing of execution of the refresh.

In the case where the banks 44 of the main memory 40 are composed of DRAM, the refresh control circuit 41 instructs execution of refresh of the DRAM. Concretely, the refresh control circuit 41 figures out the timing for refreshing the banks 44 by use of counters etc., directly sends the refresh information to the bank busy management section 50 in the main memory 40, and sends the refresh information to the bank busy management sections 50 in the requesters 30 and 31 via the system bus 10. Here, the refresh information is transmitted using idle (vacant) bits on the system bus 10, and thus requests from the requesters 30 and 31 are not disturbed by the sending of the refresh information. Thereafter, when the refresh control circuit 41 is informed by the bank busy management section 50 in the main memory 40 that refresh can be executed, the refresh control circuit 41 executes a refresh request to the bank control circuit 43.

Figure 10:
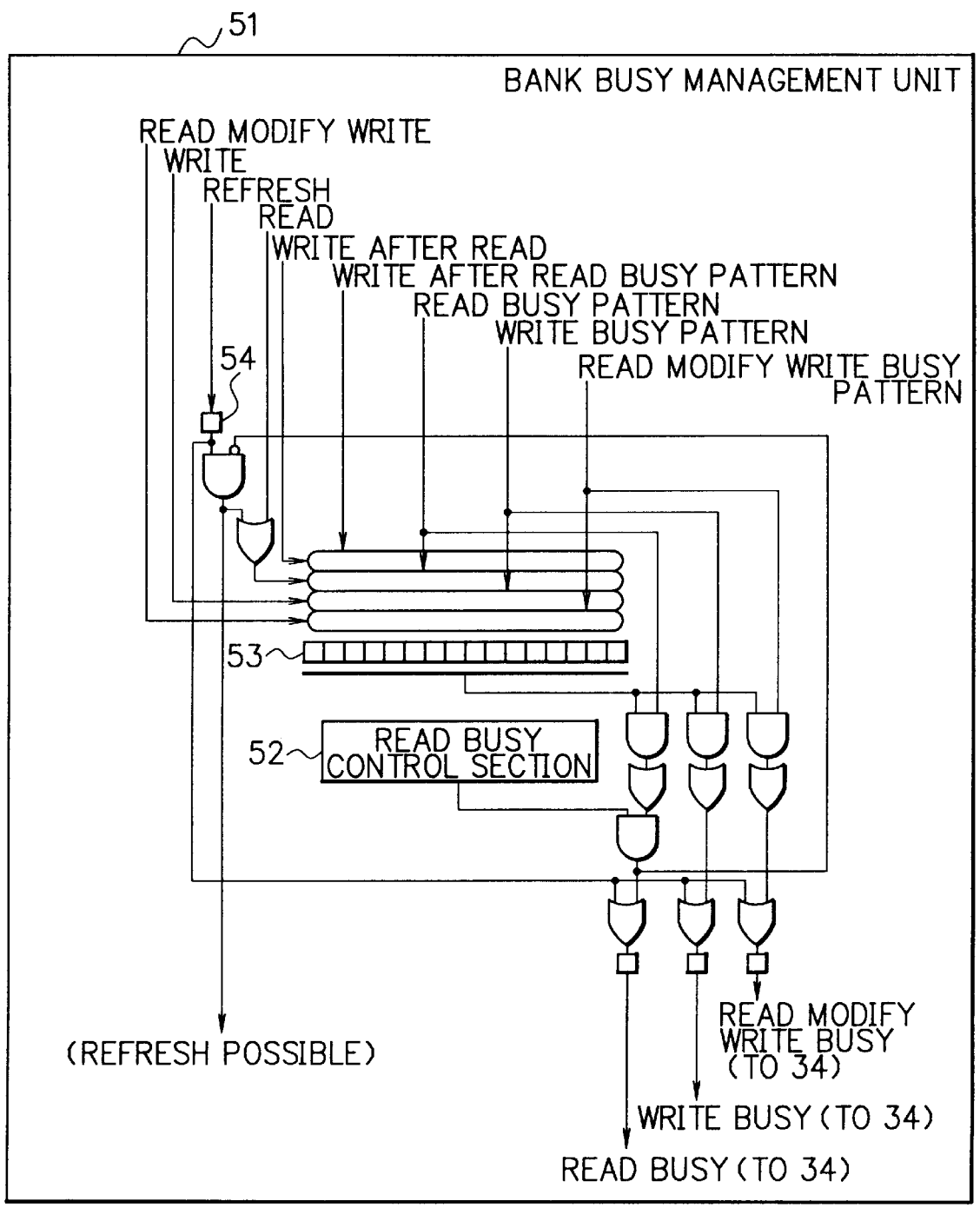
FIG. 10 is a block diagram showing internal composition of a bank busy management unit which is provided in bank busy management sections shown in FIG. 8 and FIG. 9 corresponding to each bank of the main memory of FIG. 9.

FIG. 10 is a block diagram showing internal composition of a bank busy management unit 51 of the third embodiment which is provided in the bank busy management sections 50 shown in FIG. 8 and FIG. 9 corresponding to each of the banks 44 of the main memory 40. The bank busy management unit 51 of FIG. 10 is realized by adding a refresh control flip-flop 54 to the bank busy management unit 51 of the second embodiment which has been shown in FIG. 6. When a bank busy management unit 51 in the bank busy management section 50 received the refresh information from the refresh control circuit 41, the refresh control flip-flop 54 is turned on, and thereby lets the bank 44 (designated by the refresh information) be busy for all request types. This procedure is executed in order to prevent sending of any other requests to the bank 44 and let the refresh be executed with the first priority. Referring to FIG. 10, when the refresh control flip-flop 54 is turned on, the ON signal is supplied to the OR gates at the bottom of FIG. 10, and thereby the bank busy statuses with regard to "read", "write" and "read modify write" are turned ON. Meanwhile, the ON signal from the refresh control flip-flop 54 is supplied to the left input terminal of the AND gate below the refresh control flip-flop 54. The right input terminal of the AND gate is supplied with the output of the AND gate below the read busy control section 52 which has been inverted. Therefore, the output of the AND gate below the refresh control flip-flop 54 becomes ON if the bank 44 is not busy for read requests. In other words, the bank busy management unit 51 of the bank busy management section 50 in the main memory 40 informs the refresh control circuit 41 that the refresh can be executed if (the refresh information is supplied from the refresh control circuit 41 and) the bank 44 designated by the refresh information is not busy for read requests. The ON status of the refresh control flip-flop 54 is held until execution of refresh becomes possible, and when the execution of refresh became possible, the fact is informed to the refresh control circuit 41 and the refresh control flip-flop 54 is reset to OFF. Incidentally, the bank busy management unit 51 of the bank busy management section 50 in the requesters 30 and 31 operates basically in the same way, however, the result concerning the possibility of execution of refresh obtained by the refresh control flip-flop 54 and the AND gate is not outputted by the bank busy management unit 51 of the bank busy management section 50 in the requesters 30 and 31 to the refresh control circuit 41, that is, not used by the refresh control circuit 41.

In the following, the operation of the memory control system employing pipeline-controlled bus according to the third embodiment of the present invention will be described, mainly on the difference from the first embodiment.

In the main memory 40, the refresh control circuit 41 figures out refresh timing of the banks 44 of the main memory, directly sends the refresh information to the bank busy management section 50 in the main memory 40, and sends the refresh information to the bank busy management sections 50 in the requesters 30 and 31 via the system bus 10.

When the bank busy management section 50 in the main memory 40 received the refresh information including a bank number or an address, a bank busy management unit 51 corresponding to the bank number turns on the refresh control flip-flop 54, and thereby lets the bank 44 be busy for all request types. The procedure is executed in order to provide the timing for refresh. The ON status of the refresh control flip-flop 54 is held until execution of refresh becomes possible, and when execution of refresh became possible, the fact is informed to the refresh control circuit 41 and the refresh control flip-flop 54 is reset to OFF.

When the refresh control circuit 41 is informed by the bank busy management section 50 in the main memory 40 that the refresh can be executed, the refresh control circuit 41 executes the refresh request to the bank control circuit 43.

The bank control circuit 43 which received the refresh request refreshes a bank 44 which corresponds to the bank number.

Meanwhile, when the bank busy management sections 50 in the requesters 30 and 31 received the refresh information (including the bank number or the address) via the system bus 10, a bank busy management unit 51 corresponding to the bank number turns on the refresh control flip-flop 54, and thereby informs the request sending control circuit 34 that the bank 44 is busy for all request types. The ON status of the refresh control flip-flop 54 is held until execution of refresh becomes possible.

As described above, in the memory control system employing pipeline-controlled bus according to the third embodiment of the present invention, the refresh control circuit 41 is provided to the main memory 40, and the bank busy management section 50 in the main memory 40 is utilized for determining the timing for executing refresh. Therefore, as well as the same effects as those of the first embodiment can be obtained, control of refresh of the banks 44 of the main memory 40 can be executed exclusively by the main memory 40. By providing the capability of refresh control to the side of the main memory 40, the size of hardware of the main memory 40 increases a little, however, the total amount of hardware of the memory control system can be decreased.

Figure 11:
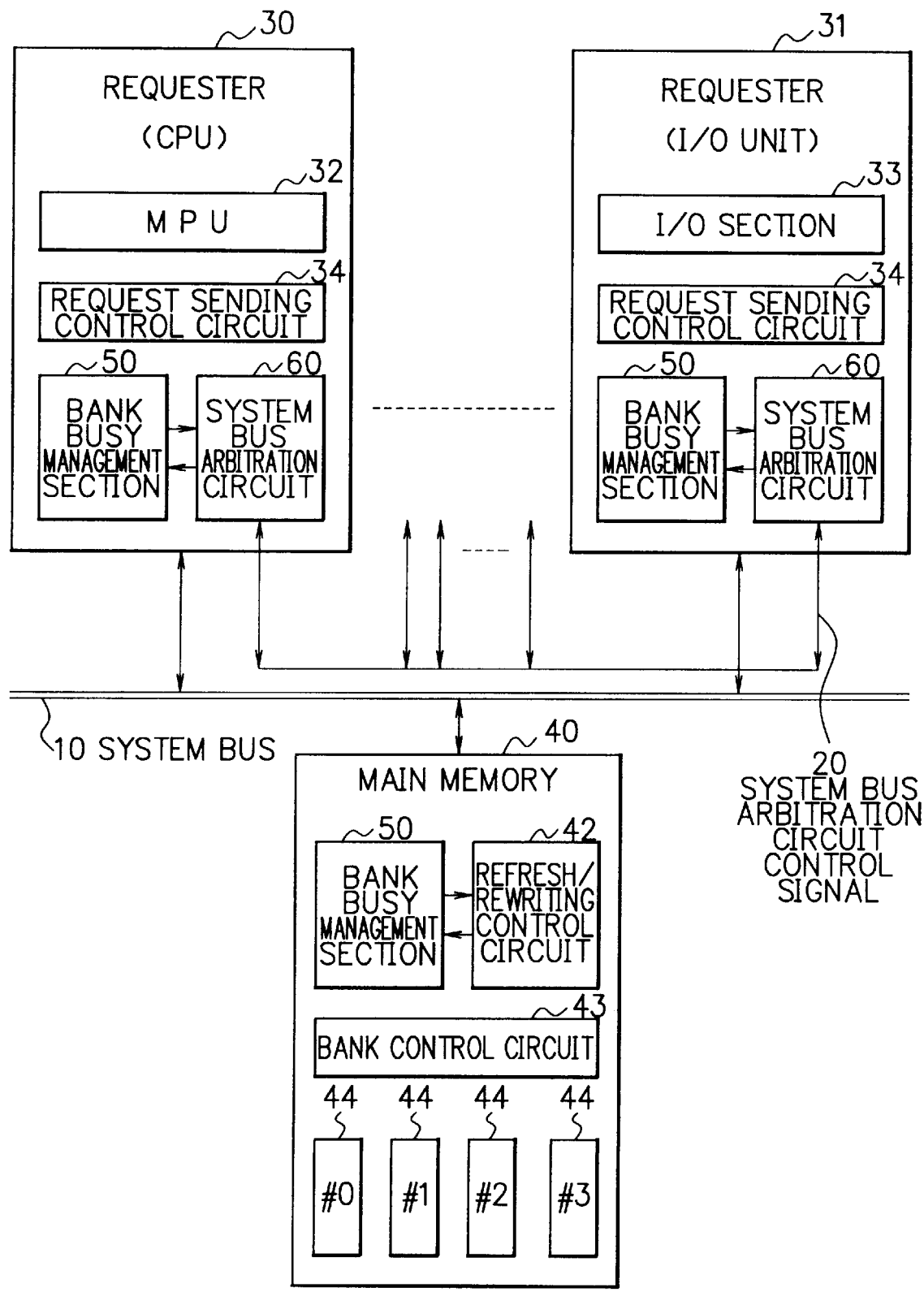
FIG. 11 is a schematic block diagram showing a memory control system employing pipeline-controlled bus according to a fourth embodiment of the present invention.

FIG. 11 is a schematic block diagram showing a memory control system employing pipeline-controlled bus according to a fourth embodiment of the present invention. In the memory control system of the fourth embodiment, the refresh control circuit 41 in the main memory 40 of the third embodiment shown in FIG. 7 is replaced by a refresh/rewriting control circuit 42 as shown in FIG. 11. In other words, the main memory 40 of the fourth embodiment is composed of the bank control circuit 43, the banks 44, the bank busy management section 50 and the refresh/rewriting control circuit 42.

FIG. 12 is a block diagram showing detailed composition of the requester 30 and the requester 31 which are shown in FIG. 11. As shown in FIG. 12, the requester 30 and the requester 31 of the fourth embodiment are basically the same as those of the third embodiment which have been shown in FIG. 8, except that refresh/rewriting information are supplied to the bank busy management section 50 of the requester via the system bus 10.

Figure 13:
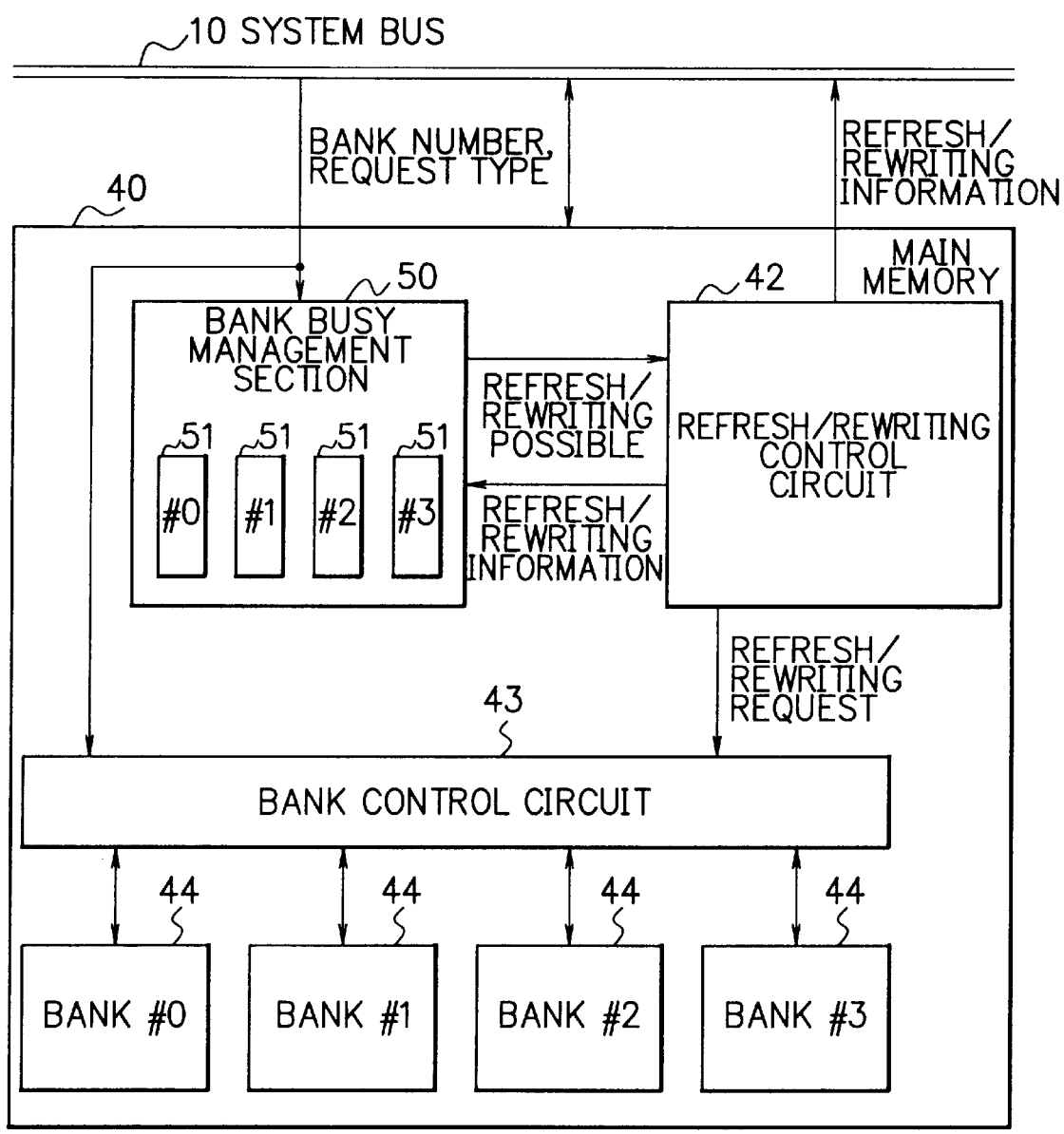
FIG. 13 is a block diagram showing detailed composition of a main memory which is shown in FIG. 11.

FIG. 13 is a block diagram showing detailed composition of the main memory 40 which is shown in FIG. 11. The main memory 40 shown in FIG. 13 includes the refresh/rewriting control circuit 42 instead of the refresh control circuit 41 which has been shown in FIG. 9. The bank busy management section 50 in the main memory 40 operates according to a request type and a bank number which are supplied via the system bus 10. The bank busy management section 50 in the main memory 40 of the fourth embodiment is utilized for determining the timing of execution of refresh and the timing of execution of rewriting (in the case where a correctable error is found in read data which has been read out from the banks 44). The refresh/rewriting control circuit 42 executes control of rewriting, as well as the control of refresh which has been explained with regard to the refresh control circuit 41 of FIG. 9.

FIG. 14 is a block diagram showing internal composition of a bank busy management unit 51 of the fourth embodiment which is provided in the bank busy management sections 50 shown in FIG. 12 and FIG. 13 corresponding to each of the banks 44 of the main memory 40. The bank busy management unit 51 of FIG. 14 is realized by adding a rewriting control flip-flop 55 to the bank busy management unit 51 of the third embodiment which has been shown in FIG. 10.

In the following, the operation of the memory control system employing pipeline-controlled bus according to the fourth embodiment of the present invention will be described, mainly on the difference from the third embodiment.

When the refresh/rewriting control circuit 42 detected a correctable error in read data which has been read out from the banks 44, the refresh/rewriting control circuit 42 directly sends rewriting information to the bank busy management section 50 in the main memory 40, and sends the rewriting information to the bank busy management sections 50 in the requesters 30 and 31 via the system bus 10. Here, the rewriting information is transmitted using a control line of the system bus 10, and thus requests from the requesters 30 and 31 are not disturbed by the sending of the rewriting information.

When the bank busy management section 50 in the main memory 40 received the rewriting information including a bank number or an address from the refresh/rewriting control circuit 42, a bank busy management unit 51 corresponding to the bank number turns on the rewriting control flip-flop 55 shown in FIG. 14 and thereby lets the bank 44 corresponding to the bank number be busy for all request types. The procedure is executed in order to provide the timing for execution of rewriting. Referring to FIG. 14, when the rewriting control flip-flop 55 is turned on, the ON signal is supplied to the OR gates at the bottom of FIG. 14, and thereby the bank busy statuses with regard to "read", "write" and "read modify write" are turned ON. Meanwhile, the ON signal from the rewriting control flip-flop 55 is supplied to the left input terminal of the AND gate below the rewriting control flip-flop 55. The right input terminal of the AND gate is supplied with the output of the OR gate expressing read modify busy status of the bank 44 which has been inverted. Therefore, the output of the AND gate below the rewriting control flip-flop 55 becomes ON if the bank 44 is not busy for read modify write requests. In other words, the bank busy management unit 51 informs the refresh control circuit 41 that the rewriting can be executed if (the rewriting information is supplied from the refresh control circuit 41 and) the bank 44 designated by the rewriting information is not busy for read modify write requests. The ON status of the rewriting control flip-flop 55 is held until execution of rewriting becomes possible, and when the execution of rewriting became possible, the fact is informed to the refresh/rewriting control circuit 42 and the rewriting control flip-flop 55 is reset to OFF.

The refresh/rewriting control circuit 42 (which has been informed by the bank busy management section 50 in the main memory 40 that execution of rewriting is possible) executes rewriting request to the bank control circuit 43.

The bank control circuit 43 which received the rewriting request from the refresh/rewriting control circuit 42 executes rewriting to the bank 44 which corresponds to the bank number.

Meanwhile, when the bank busy management sections 50 in the requesters 30 and 31 received the rewriting information including a bank number or an address via the system bus 10, a bank busy management unit 51 corresponding to the bank number turns on the rewriting control flip-flop 55, and thereby informs the request sending control circuit 34 that the bank 44 corresponding to the bank number is busy for all request types. The status of the rewriting control flip-flop 55 is held until execution of rewriting becomes possible.

As described above, in the memory control system employing pipeline-controlled bus according to the fourth embodiment of the present invention, the refresh/rewriting control circuit 42 is provided to the main memory 40, and the bank busy management section 50 in the main memory 40 is utilized for determining the timing for executing refresh and rewriting. Therefore, as well as the same effects as those of the third embodiment can be obtained, control of rewriting of the banks 44 of the main memory 40 can be executed exclusively by the main memory 40, according to detection of a correctable error in read data from the banks 44.

Figure 15:
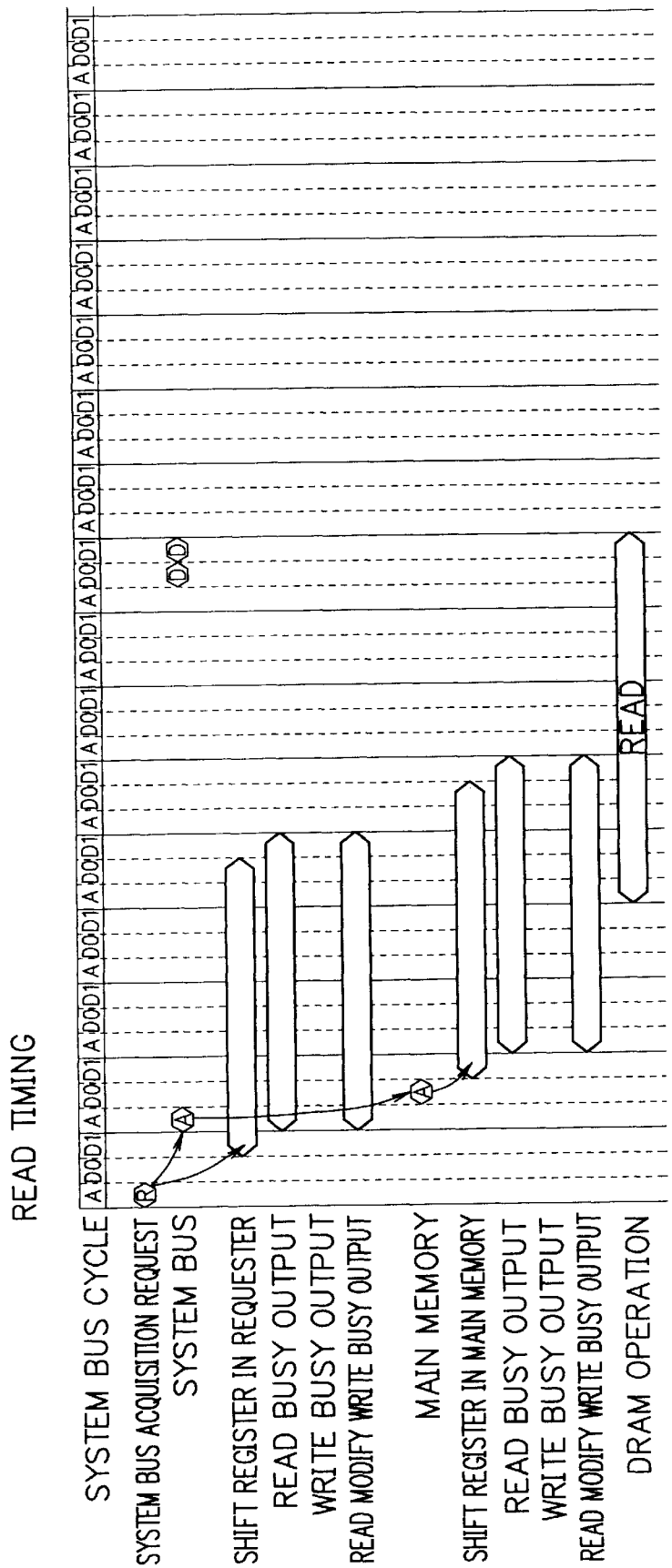
FIG. 15 is a timing chart showing the timing for read access which is executed in the memory control systems of the first through fourth embodiments.

FIG. 15 is a timing chart showing the timing for the read access which is executed in the memory control systems of the first through fourth embodiments. Referring to FIG. 15, the "A", "D0" and "D1" in the "system bus cycle" represent a period for sending an address, a period for sending front part data, and a period for sending rear part data, respectively. The "R" that is surrounded by a hexagon is expressing sending of a system bus acquisition request to the system bus 10. The "A" that is surrounded by a hexagon is expressing movement of a request (an address and a request type). The "D" that is surrounded by a hexagon is expressing sending of data to the system bus 10. If a requester 30 or 31 which had sent out the system bus acquisition request in the period "A" could acquire the right to use the system bus 10, the requester 30 or 31 sends out a read request (a request type "read" and an address) to the system bus 10 in the next period "A". According to the request type and address, data is read out from a bank 44 and the read data is sent to the system bus 10 by the main memory 40 in the periods "D0" and "D1" (a predetermined interval after the sending of the read request). In this case, the shift registers 53 in the bank busy management sections 50 of the requesters 30 and 31 are set (the read busy pattern is copied from a register) in a period "D1", and indicate busy statuses corresponding to each request types from the moment (the period "A") when the read request (the request type and the address) is sent to the system bus 10. In the first through fourth embodiments, due to the sending of the read request to a bank 44, the bank 44 becomes busy for "read" and "read modify write". In the bank busy management section 50 in the main memory 40 of the third and fourth embodiments, the shift register 53 of a bank busy management unit 51 corresponding to the request which has been supplied via the system bus 10 is set (the read busy pattern is copied from a register) in the period "D1" one cycle after the setting of the shift registers 53 of the requesters 30 and 31, and thereafter, the bank busy management unit 51 indicates busy statuses of the bank 44.

FIG. 16 is a timing chart showing the timing for the write access which is executed in the memory control systems of the first through fourth embodiments. The timing till the acquisition of the system bus 10 is the same as that in the read request of FIG. 15. Write data is sent out in the period "D0" and "D1" (a predetermined interval after sending of the write request) by a requester 30 or 31 which has sent out the write request (request type and address). The main memory 40 which received the write data executes write access to the bank 44 which corresponds to the address. In the first through fourth embodiments, due to the sending of the write request to a bank 44, the bank 44 becomes busy for "read", "write" and "read modify write" in the manners which are shown in the timing chart of FIG. 16.

FIG. 17 is a timing chart showing the timing for the read modify write access which is executed in the memory control systems of the first through fourth embodiments. The timing till the acquisition of the system bus 10 is the same as that in the read request of FIG. 15. In the first through fourth embodiments, due to the sending of the read modify write request to a bank 44, the bank 44 becomes busy for "read", "write" and "read modify write" in the manners which are shown in the timing chart of FIG. 17.

FIG. 18A and FIG. 18B are timing charts showing the timing for the refresh which is executed in the memory control systems of the third and fourth embodiments. FIG. 18A shows a case where a bank 44 to be refreshed is not busy. Referring to FIG. 18A, due to the turning on of the refresh control flip-flop 54 of the bank busy management unit 51 (corresponding to a bank 44) of the bank busy management section 50, the bank 44 becomes busy for all request types. FIG. 18B shows a case where a bank 44 to be refreshed is busy and thus the refresh can not be executed immediately. The refresh control flip-flop 54 is reset after the read busy disappeared, and the refresh is executed.

Figure 19B:
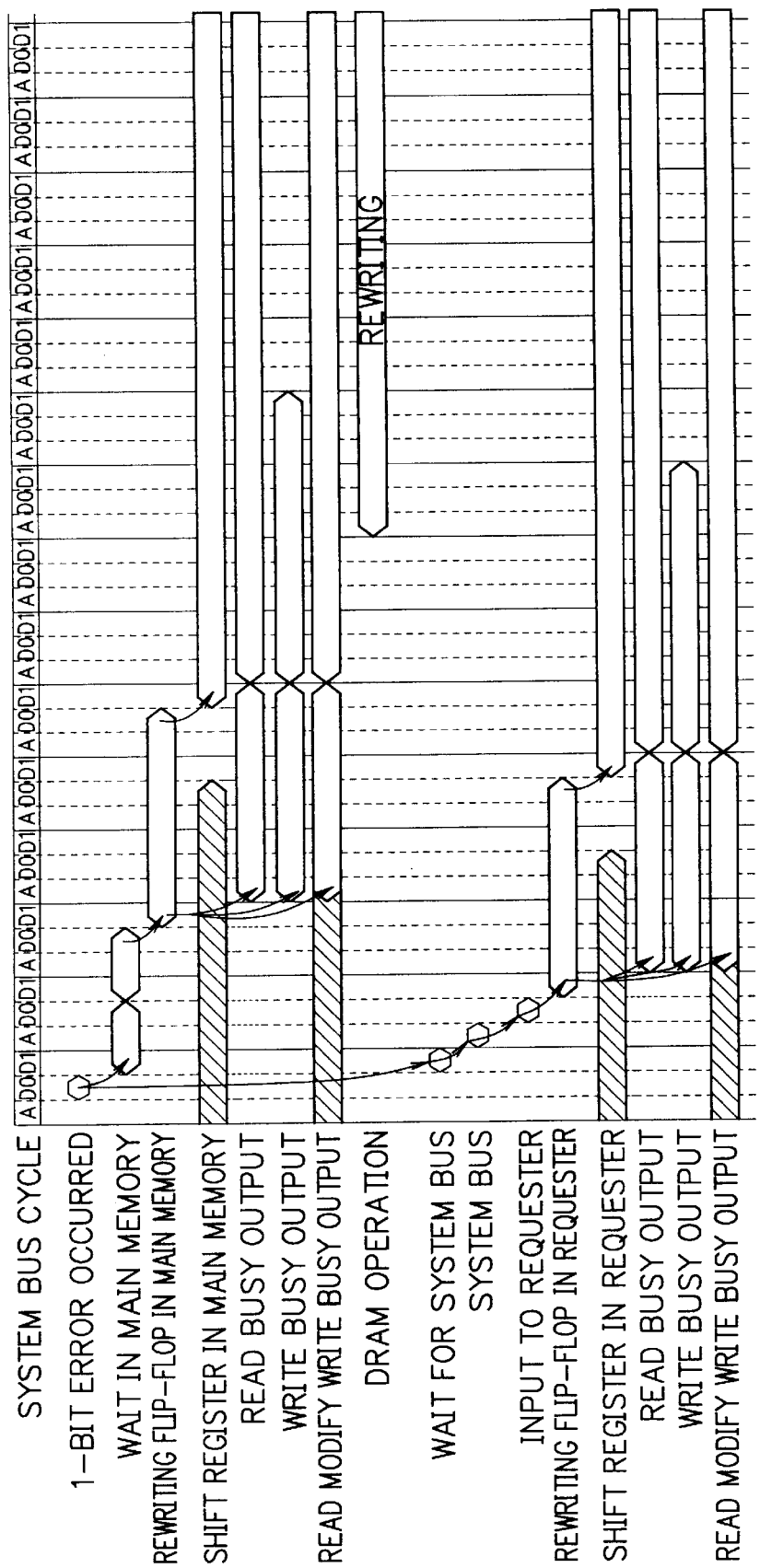

FIG. 19A and FIG. 19B are timing charts showing the timing for the rewriting access which is executed in the memory control system of the fourth embodiment. FIG. 19A shows a case where a bank 44 to which the rewriting will be executed is not busy. Referring to FIG. 19A, due to the turning on of the rewriting control flip-flop 55 of the bank busy management unit 51 (corresponding to a bank 44 in the main memory 40) of the bank busy management section 50, the bank 44 becomes busy for all request types. FIG. 19B shows a case where a bank 44 to which the rewriting will be executed is busy and thus the rewriting can not be executed immediately. The rewriting control flip-flop 55 is reset after the read modify write busy disappeared, and the rewriting is executed.

FIG. 20A through FIG. 20E are timing charts showing the timing of the memory control systems of the first through fourth embodiments, in the case where a read request is sent to a bank 44 after a write request is sent to the same bank 44. In each of the figures, an "A" surrounded by a hexagon on the left end represents a write request, and an "A" surrounded by a hexagon after the former "A" represents a read request. Execution of the write request (i.e. write access) can not be done until write data is supplied from the requester 30 or 31 to the main memory 40 via the system bus 10. The read request which is supplied to the main memory 40 in the interval is executed with higher priority than the write request. FIGS. 20A and 20B show cases where the execution of the previously supplied write request to the bank 44 is not disturbed by the execution of the read request to the bank 44. In these cases, the busy pattern which is set into the shift register 53 of the bank busy management unit 51 due to the subsequently supplied read request is the ordinary read busy pattern. FIGS. 20C through 20E show cases where the execution of the previously supplied write request to the bank 44 is disturbed (delayed) by the execution of the read request to the bank 44. The execution of the write request to the bank 44 is suspended by the bank control circuit 43 until the read request is completed. In these cases, a "write after read" busy pattern which is different from the ordinary read busy pattern is set into the shift register 53 of the bank busy management unit 51 due to the subsequently supplied read request.

As set forth hereinabove, by the memory control system employing pipeline-controlled bus according to the embodiments of the present invention, the following basic effects can be obtained.

First, the requesters which grasp the bank busy statuses do not send void requests to system bus. Therefore, performance of a memory control system can be improved due to the efficient use of the system bus.

Second, due to the employment the pipeline-controlled system bus, the bank control circuit (i.e. the aforementioned memory controller) in the main memory no more has to be involved in the arbitration for acquiring the right to use the system bus. And the bank control circuit is not required to be provided with buffers for temporarily storing addresses and data, since busy management of the banks of the main memory is executed on the side of the requesters. Therefore, the main memory can be realized by considerably simple logical construction and small hardware.

Third, due to the masking of the read busy status by the read busy control section, the read request to the same bank just after a write request can be sent to the bank. Therefore, usage efficiency of the banks of the main memory in the system employing the pipeline-controlled bus can be improved and thereby performance of the system can be increased.

Fourth, the busy management of the banks of the main memory is executed by use of the shift registers, and the busy patterns which are prestored in the aforementioned registers with regard to each of the request types can be predetermined arbitrarily so as to fit the specific RAM that is used for the bank. Therefore, any types of RAMs having various cycle times can be employed for the banks of the main memory, and it is also possible to realize each of the banks of the main memory employing RAMs having different types and different cycle times.

The specific effects of each embodiment have been described in the above description of the embodiments, and thus repeated description thereof is omitted for brevity.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A memory control system employing pipeline-controlled bus comprising: a main memory including a plurality of banks which are composed of RAM (Random Access Memory); two or more requesters each of which includes an MPU or an I/O means which outputs a request that is addressed to a bank of a main memory; and a pipeline-controlled system bus which connects the main memory and each of the requesters, wherein:

each of the requesters includes:
a request sending control means for receiving the request from the MPU or the I/O means, executing a system bus acquisition request to a system bus arbitration means of the requester itself and system bus arbitration means of other requesters after confirming that the bank to which the request has been addressed is not busy for the request by referring to a bank busy status of the bank which is supplied from a bank busy management means of the requester, and sending the request to the main memory via the pipeline-controlled system bus if the system bus acquisition request could acquire the right to use the pipeline-controlled system bus in consequence of distributed arbitration which is executed by the system bus arbitration means which are provided in each of the requesters;
the system bus arbitration means for receiving the system bus acquisition requests from the request sending control means of the requesters, executing the distributed arbitration between the system bus acquisition requests, informing a request type and a bank number concerning a system bus acquisition request that could acquire the right to use the pipeline-controlled system bus in consequence of the distributed arbitration to the bank busy management means of the requester, and informing the request sending control means of the requester that the requester itself could acquire the right to use the pipeline-controlled system bus if the system bus acquisition request from the requester could acquire the right to use the pipeline-controlled system bus in consequence of the distributed arbitration; and
the bank busy management means for storing the bank busy statuses of the banks in the main memory with regard to each of the request types, managing the bank busy statuses of the banks based on the request type and the bank number which are informed by the system bus arbitration means of the requester, and informing the bank busy statuses to the request sending control means,
and the main memory includes a bank control means for controlling access to the banks according to a request type and an address which are included in the request that is supplied from the request sending control means of the requester via the pipeline-controlled system bus.

2. A memory control system employing pipeline-controlled bus as claimed in claim 1, wherein the bank busy management means includes a read busy control means for masking the bank busy status of a bank with regard to the read request so that a read request can be sent to the bank during the interval between supply of a write request to the bank and supply of write data corresponding to the write request to the bank.

3. A memory control system employing pipeline-controlled bus as claimed in claim 1, wherein the bank busy management means is composed including shift registers corresponding to each of the banks of the main memory, in which a busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

4. A memory control system employing pipeline-controlled bus comprising: a main memory including a plurality of banks which are composed of RAM (Random Access Memory); two or more requesters each of which includes an MPU or an I/O means which outputs a request that is addressed to a bank of a main memory; and a pipeline-controlled system bus which connects the main memory and each of the requesters, wherein:

each of the requesters includes:
a request sending control means for receiving the request from the MPU or the I/O means, executing a system bus acquisition request to a system bus arbitration means of the requester itself and system bus arbitration means of other requesters after confirming that the bank to which the request has been addressed is not busy for the request by referring to a bank busy status of the bank which is supplied from a bank busy management means of the requester, and sending the request to the main memory via the pipeline-controlled system bus if the system bus acquisition request could acquire the right to use the pipeline-controlled system bus in consequence of distributed arbitration which is executed by the system bus arbitration means which are provided in each of the requesters;

the system bus arbitration means for receiving the system bus acquisition requests from the request sending control means of the requesters, executing the distributed arbitration between the system bus acquisition requests, informing a request type and a bank number concerning a system bus acquisition request that could acquire the right to use the pipeline-controlled system bus in consequence of the distributed arbitration to the bank busy management means of the requester, and informing the request sending control means of the requester that the requester itself could acquire the right to use the pipeline-controlled system bus if the system bus acquisition request from the requester could acquire the right to use the pipeline-controlled system bus in consequence of the distributed arbitration;

a refresh control means for controlling execution of refresh of the banks in the main memory, and outputting a refresh request to the request sending control means when need for refreshing a bank occurred; and the bank busy management means for storing the bank busy statuses of the banks in the main memory with regard to each of the request types, managing the bank busy statuses of the banks based on the request type and the bank number which are informed by the system bus arbitration means of the requester, and informing the bank busy statuses to the request sending control means, and the main memory includes a bank control means for controlling access to the banks according to a request type and an address which are included in the request that is supplied from the request sending control means of the requester via the pipeline-controlled system bus.

5. A memory control system employing pipeline-controlled bus as claimed in claim 4, wherein the bank busy management means includes a read busy control means for masking the bank busy status of a bank with regard to the read request so that a read request can be sent to the bank during the interval between supply of a write request to the bank and supply of write data corresponding to the write request to the bank.

6. A memory control system employing pipeline-controlled bus as claimed in claim 4, wherein the bank busy management means is composed including shift registers corresponding to each of the banks of the main memory, in which a busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

7. A memory control system employing pipeline-controlled bus comprising: a main memory including a plurality of banks which are composed of RAM (Random Access Memory); two or more requesters each of which includes an MPU or an I/O means which outputs a request that is addressed to a bank of a main memory; and a pipeline-controlled system bus which connects the main memory and each of the requesters, wherein:

each of the requesters includes:
a request sending control means for receiving the request from the MPU or the I/O means, executing a system bus acquisition request to a system bus arbitration means of the requester itself and system bus arbitration means of other requesters after confirming that the bank to which the request has been addressed is not busy for the request by referring to a bank busy status of the bank which is supplied from a bank busy management means of the requester, and sending the request to the main memory via the pipeline-controlled system bus if the system bus acquisition request could acquire the right to use the pipeline-controlled system bus in consequence of distributed arbitration which is executed by the system bus arbitration means which are provided in each of the requesters;

the system bus arbitration means for receiving the system bus acquisition requests from the request sending control means of the requesters, executing the distributed arbitration between the system bus acquisition requests, informing a request type and a bank number concerning a system bus acquisition request that could acquire the right to use the pipeline-controlled system bus in consequence of the distributed arbitration to the bank busy management means of the requester, and informing the request sending control means of the requester that the requester itself could acquire the right to use the pipeline-controlled system bus if the system bus acquisition request from the requester could acquire the right to use the pipeline-controlled system bus in consequence of the distributed arbitration; and the bank busy management means for storing the bank busy statuses of the banks in the main memory with regard to each of the request types, managing the bank busy statuses of the banks based on the request type and the bank number which are informed by the system bus arbitration means of the requester and refresh information which is supplied from the main memory via the pipeline-controlled system bus, and informing the bank busy statuses to the request sending control means, and the main memory includes:
a bank control means for controlling access to the banks according to a request type and an address which are included in the request that is supplied from the request sending control means of the requester via the pipeline-controlled system bus;

a refresh control means for controlling execution of refresh of the banks in the main memory, directly sending the refresh information to a subsidiary bank busy management means in the main memory and sending the refresh information to the bank busy management means in the requesters via the pipeline-controlled system bus when need for refreshing a bank occurred, and executing a refresh request to the bank control means when the subsidiary bank busy management means informed the refresh control means that execution of refresh of the bank is possible; and the subsidiary bank busy management means for storing the bank busy statuses of the banks in the main memory with regard to each of the request types, managing the bank busy statuses of the banks based on the request which is supplied from the requester via the pipeline-controlled system bus and the refresh information which is supplied from the refresh control means, judging whether or not execution of refresh of the bank is possible based on the bank busy statuses, and informing the refresh control means that the execution of refresh of the bank is possible if possible.

8. A memory control system employing pipeline-controlled bus as claimed in claim 7, wherein the bank busy management means includes a read busy control means for masking the bank busy status of a bank with regard to the read request so that a read request can be sent to the bank during the interval between supply of a write request to the bank and supply of write data corresponding to the write request to the bank.

9. A memory control system employing pipeline-controlled bus as claimed in claim 7, wherein the bank busy management means is composed including shift registers corresponding to each of the banks of the main memory, in which a busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

10. A memory control system employing pipeline-controlled bus as claimed in claim 7, wherein the subsidiary bank busy management means includes a refresh control flip-flop corresponding to each bank of the main memory for holding its status until execution of refresh of the bank becomes possible, and informing the refresh control means that the execution of refresh of the bank has become possible when it became possible.

11. A memory control system employing pipeline-controlled bus comprising: a main memory including a plurality of banks which are composed of RAM (Random Access Memory); two or more requesters each of which includes an MPU or an I/O means which outputs a request that is addressed to a bank of a main memory; and a pipeline-controlled system bus which connects the main memory and each of the requesters, wherein:

each of the requesters includes:
a request sending control means for receiving the request from the MPU or the I/O means, executing a system bus acquisition request to a system bus arbitration means of the requester itself and system bus arbitration means of other requesters after confirming that the bank to which the request has been addressed is not busy for the request by referring to a bank busy status of the bank which is supplied from a bank busy management means of the requester, and sending the request to the main memory via the pipeline-controlled system bus if the system bus acquisition request could acquire the right to use the pipeline-controlled system bus in consequence of distributed arbitration which is executed by the system bus arbitration means which are provided in each of the requesters;
the system bus arbitration means for receiving the system bus acquisition requests from the request sending control means of the requesters, executing the distributed arbitration between the system bus acquisition requests, informing a request type and a bank number concerning a system bus acquisition request that could acquire the right to use the pipeline-controlled system bus in consequence of the distributed arbitration to the bank busy management means of the requester, and informing the request sending control means of the requester that the requester itself could acquire the right to use the pipeline-controlled system bus if the system bus acquisition request from the requester could acquire the right to use the pipeline-controlled system bus in consequence of the distributed arbitration; and
the bank busy management means for storing the bank busy statuses of the banks in the main memory with regard to each of the request types, managing the bank busy statuses of the banks based on the request type and the bank number which are informed by the system bus arbitration means of the requester, refresh information which is supplied from the main memory via the pipeline-controlled system bus and rewriting information which is supplied from the main memory via the pipeline-controlled system bus, and informing the bank busy statuses to the request sending control means, and the main memory includes:
a bank control means for controlling access to the banks according to a request type and an address which are included in the request that is supplied from the request sending control means of the requester via the pipeline-controlled system bus;
a refresh control means for controlling execution of refresh of the banks in the main memory, directly sending the refresh information to a subsidiary bank busy management means in the main memory and sending the refresh information to the bank busy management means in the requesters via the pipeline-controlled system bus when need for refreshing a bank occurred, and executing a refresh request to the bank control means when the subsidiary bank busy management means informed the refresh control means that execution of refresh of the bank is possible;
a rewriting control means for directly sending the rewriting information to the subsidiary bank busy management means in the main memory and sending the rewriting information to the bank busy management means in the requesters via the pipeline-controlled system bus when a correctable error is found in read data which has been read out from the banks, and executing a rewriting request to the bank control means when the subsidiary bank busy management means informed the rewriting control means that execution of rewriting to the bank is possible; and
the subsidiary bank busy management means for storing the bank busy statuses of the banks in the main memory with regard to each of the request types, managing the bank busy statuses of the banks based on the request which is supplied from the requester via the pipeline-controlled system bus, the refresh information which is supplied from the refresh control means and the rewriting information which is supplied from the rewriting control means, judging whether or not execution of refresh of the bank is possible based on the bank busy statuses, informing the refresh control means that the execution of refresh of the bank is possible if possible, judging whether or not execution of rewriting to the bank is possible based on the bank busy statuses, and informing the rewriting control means that the execution of rewriting the bank is possible if possible.

12. A memory control system employing pipeline-controlled bus as claimed in claim 11, wherein the bank busy management means includes a read busy control means for masking the bank busy status of a bank with regard to the read request so that a read request can be sent to the bank during the interval between supply of a write request to the bank and supply of write data corresponding to the write request to the bank.

13. A memory control system employing pipeline-controlled bus as claimed in claim 11, wherein the bank busy management means is composed including shift registers corresponding to each of the banks of the main memory, in which a busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

14. A memory control system employing pipeline-controlled bus as claimed in claim 11, wherein the subsidiary bank busy management means includes:

a refresh control flip-flop corresponding to each bank of the main memory for holding its status until execution of refresh of the bank becomes possible, and informing the refresh control means that the execution of refresh of the bank has become possible when it became possible; and a rewriting control flip-flop corresponding to each bank of the main memory for holding its status until execution of rewriting to the bank becomes possible, and informing the rewriting control means that the execution of rewriting to the bank has become possible when it became possible.

15. A method for controlling a main memory which includes a plurality of banks composed of RAM (Random Access Memory) and which is connected via a pipeline-controlled system bus to two or more requesters each of which including an MPU or an I/O means which outputs a request that is addressed to a bank of the main memory, comprising the steps of:

a requesting step in which the MPU or the I/O means of the requester outputs a request to a request sending control means of the requester;

a system bus acquisition request step in which the request sending control means executes a system bus acquisition request to a system bus arbitration means of the requester itself and system bus arbitration means of other requesters after confirming that the bank to which the request has been addressed is not busy for the request by referring to a bank busy status of the bank which is supplied from a bank busy management means of the requester;

a system bus arbitration step in which the system bus arbitration means in the requester executes distributed arbitration between the system bus acquisition requests which have been supplied from the request sending control means of the requesters, informs a request type and a bank number concerning a system bus acquisition request that could acquire the right to use the pipeline-controlled system bus in consequence of the distributed arbitration to the bank busy management means of the requester, and informs the request sending control means of the requester that the requester itself could acquire the right to use the pipeline-controlled system bus if the system bus acquisition request from the requester could acquire the right to use the pipeline-controlled system bus in consequence of the distributed arbitration;

a request sending step in which the request sending control means sends the request to the main memory via the pipeline-controlled system bus if the system bus acquisition request from the requester could acquire the right to use the pipeline-controlled system bus in the system bus arbitration step; and a bank busy management step in which the bank busy management means, which stores the bank busy statuses of the banks in the main memory with regard to each of the request types, manages the bank busy statuses of the banks based on the request type and the bank number which have been informed by the system bus arbitration means of the requester, and informs the bank busy statuses to the request sending control means.

16. A method as claimed in claim 15, wherein in the bank busy management step, a read busy control means of the bank busy management means masks the bank busy status of a bank with regard to the read request so that a read request can be sent to the bank during the interval between supply of a write request to the bank and supply of write data corresponding to the write request to the bank.

17. A method as claimed in claim 15, wherein the bank busy management means is composed including shift registers corresponding to each of the banks of the main memory, and in the bank busy management step, a busy pattern corresponding to the request type which is informed by the system bus arbitration means is set in one of the shift registers which corresponds to the bank number informed by the system bus arbitration means, and the bank busy status of a bank with regard to each particular request type is detected by detecting overlap between current status of the shift register and a busy pattern corresponding to the particular request type.

18. A method as claimed in claim 15, further comprising a refresh request step in which a refresh control means in the requester outputs a refresh request to the request sending control means when need for refreshing a bank occurred.

* * * * *